United States Patent [19]

Bouyoucos et al.

[11] E Re. 30,109

[45] Reissued Oct. 9, 1979

[54] HYDROACOUSTIC APPARATUS AND VALVING MECHANISMS FOR USE THEREIN

[75] Inventors: John V. Bouyoucos, Rochester; Roger L. Selsam, Fairport; Dennis R. Courtright, Canandaigua, all of N.Y.

[73] Assignee: Hydroacoustics Inc., Rochester, N.Y.

[21] Appl. No.: 822,112

[22] Filed: Aug. 5, 1977

Related U.S. Patent Documents

Reissue of:

[64] Patent No.: 4,005,637
Issued: Feb. 1, 1977
Appl. No.: 522,977
Filed: Nov. 11, 1974

[51] Int. Cl.[2] ..... F01L 17/00; F01L 25/04; F01B 7/18

[52] U.S. Cl. ..... 91/276; 91/303; 91/321; 91/328

[58] Field of Search ..... 91/303, 321, 276, 328

[56] References Cited

U.S. PATENT DOCUMENTS

| | | | |
|---|---|---|---|
| 626,497 | 6/1899 | Meissner | 91/303 |
| 692,799 | 2/1902 | Soley | 91/303 |
| 3,050,033 | 8/1962 | Carey | 91/303 |
| 3,079,900 | 3/1963 | Hunnicut | 91/303 |
| 3,411,592 | 11/1968 | Montabert | 91/303 |
| 3,766,830 | 10/1973 | Montabert | 91/321 |

*Primary Examiner*—Paul E. Maslousky
*Attorney, Agent, or Firm*—Martin LuKacher

[57] ABSTRACT

Impact tools are described which are capable of developing percussive forces for rock drilling and other repetitive high force applications. A hydroacoustic oscillator contained in such tools includes a hammer and a valve mechanism which is actuated by the hammer for controlling the flow of pressurized fluid so as to establish pressure variations which sustain the oscillation of the hammer. A number of alternative valve mechanisms are disclosed, each including a valve element, the motion of which is controlled by controlling the flow of fluid with respect to the valve element as the hammer and valve element move relative to each other. Such flow control is afforded by chambers defined by the valve element; hydraulic fluid flow with respect to which is controlled so as to determine the deceleration of the valve element and the motion of the element in its actuation by the hammer.

12 Claims, 48 Drawing Figures

HYDROACOUSTIC APPARATUS AND VALVING MECHANISMS FOR USE THEREIN

Matter enclosed in heavy brackets [ ] appears in the original patent but forms no part of this reissue specification; matter printed in italics indicates the additions made by reissue.

The present invention relates to hydroacoustic apparatus and particularly to valve structures for use in hydroacoustic oscillators which are adapted to produce percussive forces.

Hydroacoustic apparatus provided by the invention are especially suitable for use in impact tools such as rock drills, pile drivers, and demolition tools. The invention is also applicable for use in hydraulic apparatus wherein parts are movable with respect to each other and actuated as at high repetition rates.

This application is related to the following applications all of which have a common assignee and to which reference is hereby made:

a. U.S. patent application, Ser. No. 285,240, filed in the name of John V. Bouyoucos on Aug. 31, 1973, now U.S. Pat. No. 3,896,889;

b. U.S. patent application Ser. No. 463,626, filed in the name of John V. Bouyoucos on Apr. 24, 1974 now U.S. Pat. No. 3,911,789;

c. U.S. patent application, Ser. No. 463,625, filed Apr. 24, 1974, now U.S. Pat. No. 3,903,972, in the names of John V. Bouyoucos and Roger L. Selsam; and d. the following U.S. patent applications filed simultaneously with this application:

i. Application, Ser. No. 522,978, filed in the name of John V. Bouyoucos, ii. Application Ser. No. 522,823, filed in the names of John V. Bouyoucos, Roger L. Selsam, and Robert O. Wilson, iii. Application Ser. No. 522,824, filed in the name of Boyd A. Wise.

Related application Ser. No. 285,240 describes tools for generating percussive forces in which a hydroacoustic self-excited oscillator having a pressure actuated oscillating mass, operates a valve element. The valve element is part of a valve mechanism which modulates the flow of hydraulic fluid to provide pressure variations for sustaining the oscillation of the mass. Related applications Ser. Nos. 463,625 and 463,626 describe improved tools of the same general class as described in application Ser. No. 285,240. In these latter applications as in application Ser. No. 285,240, the motion of the mass is coupled to the valving mechanism in a hydraulic fluid cavity and switches the pressure of the hydraulic fluid in that cavity abruptly between return and supply pressures to obtain driving forces which accelerate the mass with respect to a hydraulic spring system. The energy of the accelerated mass is transferred to the spring system which, when the valve mechanism subsequently switches the pressure in the cavity to remove the accelerating force, decelerates the mass to zero velocity and then drives the mass with increasing acceleration in the opposite direction toward an impact position where percussive energy is generated.

In the tools described in these related applications the mass operates the valving element through a fluid-film contact. Specifically, the mass has steps or rings which make contact with the valve element ends or step areas through a hydraulic fluid film, the fluid dynamics of which operate to damp the valve and control its motion in its contact with the hammer step or ring. It is desirable to provide more effective or positive control over the motion of the valve so as to define its displacement-time history. It is preferable to provide such control over the entire displacement of the valve as it shuttles back and forth to switch the pressure in the hydraulic-fluid filled cavity and obtain the hydraulic forces which accelerate the mass. In addition, it is desirable to control the stress levels imposed upon the valve element to reduce the possibility of any erratic motion thereof which might cause inopportune switching of the fluid pressure in the cavity. It is further desirable that the mass, which may afford the hammer of the impact tool, and the valve element be of simple design adaptable for assembly into an impact tool oscillator and reliable in operation to provide for a reliable impact tool.

The general objects of this invention are as follows:

1. To provide improved apparatus for delivering percussive energy to a load.

2. To provide improved impact tools.

3. To provide improved hydraulically operated percussive devices.

4. To provide improved self-excited hydroacoustic oscillators.

5. To provide impoved hydroacoustic oscillators in which a pressure actuated mass, which can serve as a hammer to transfer percussive or impact forces to a load, operates a valve element which is separate from the mass.

6. To provide an improved valve structure for hydroacoustic oscillator in which a pressure actuated mass operates a valve element to modulate the flow of hydraulic fluid which sustains the oscillation of the mass.

7. To provide an improved valve structure for use in hydroacoustic oscillators in which erratic valving action is counteracted.

8. To provide an improved valve structure for a hydraulic oscillator in which valving is controlled by a hydraulically actuated mass, which valve structure affords a predetermined action so as to modulate the flow of hydraulic fluid in a manner to maintain self-excited oscillations of the mass.

9. To provide an improved valve structure for an oscillator having a hydraulically actuated mass in which the valve actuation is also hydraulically controlled to provide forces for actuating, damping or otherwise controlling the motion of the valve.

10. To provide an improved valve structure for use in a hydroacoustic oscillator by which the motion of a valve element which can have high velocity relative to an oscillating mass or other valve operating means can be controlled.

11. To provide an improved valve structure for use in a hydraulic oscillator which is adapted to generate percussive forces, as a mass therein oscillates, which mass cooperates with a valve element adapted to have high relative velocity with respect to the mass, which relative velocity can increase as each end of the stroke of the mass is reached, whereby the motion of the valve element is controlled either continuously or at the end of the stroke without application of excessive forces or stress to the valve element and without introducing erratic valve element motion.

12. To provide an improved valve structure for use in hydraulic oscillators wherein a valve element is movably disposed in a fluid-filled cavity, the motion of which valve element is hydraulically controlled without adverse cavitation effects.

13. To provide an improved hydraulic oscillator having an oscillatory pressure actuated mass and a valve element associated with the mass within a cavity in which mass actuating hydraulic pressures are produced when the valve element moves relative to the mass for modulating the flow of fluid into that cavity, and in which the motion of the valve element is hydraulically controlled to provide a predetermined time displacement characteristic thereof relative to the displacement of the mass.

More specific objects of this invention are:

1. To provide an improved valve structure for a hydraulic oscillator having a pressure-actuated mass wherein the motion of a valve element which modulates the flow of hydraulic fluid to produce such pressure variations is hydraulically pressure controlled for travel towards one end of the stroke of the valve and hydraulically mechanically controlled for travel in a direction toward the opposite end of its stroke.

2. To provide an improved impact tool in which impact or percussive energy is produced by a pressure actuated hammer which oscillates with respect to a valve element which modulates the flow of hydraulic fluid to produce the actuating pressures in which the valve element is hydraulically controlled for movement in opposite directions relative to the hammer as the hammer travels in opposite directions such that the valve element has a predetermined displacement characteristic with respect to the displacement of the hammer.

3. To provide an improved impact tool having a hydraulic oscillator including a movable hydraulically controlled valve structure which enables the use of a hammer which is of a design which can be readily fabricated and which is reliable in operation.

4. To provide a valve structure for a hydraulic oscillator wherein a valve element is movable relative to a hydraulically driven mass in which the valve element is hydraulically held at the end of its stroke until actuated by the mass.

Briefly described, the invention is embodied in a hydraulic operated oscillator apparatus. This apparatus has a pressure actuated mass. The mass operates a valve element which modulates the flow of hydraulic fluid to produce pressure variations which sustain the oscillation of the mass. The valve element is included in a valve mechanism. The valve element is so configured as to confine a volume of the hydraulic fluid, which for example may be part of the fluid in a cavity containing both the valve element and the mass and in which the pressure variations are produced. The flow of the fluid into and out of this volume is controlled as by means of fluid resistances, orifices or pressurized hydraulic fluid supply and return means. The flow of the fluid into and out of the volume is controlled as a function of the position of the valve element or the relative velocity of the mass and the valve element. The motion of the valve element is thereby controlled to insure that the valve element has the requisite displacement time history which results in a desired sequence of actuating pressures to enable the oscillation of the mass to be sustained. By the position of the valve element is meant its position with respect to some fixed reference, say the housing of the hydraulic oscillator, or with respect to the mass. In some cases the position of the valve element with respect to the housing is reflected as in the position of the mass which then controls the flow with respect to the volume.

More specifically the invention may be embodied in an impact tool which produces percussive forces wherein the mass provides a hammer which is mounted for oscillatory movement in a housing and is accelerated to an impact position. The valve mechanism modulates the flow of hydraulic fluid to a cavity in the housing into which the hammer extends. The valve mechanism includes the valve element which is also movably mounted in the cavity. Supply and return ports are disposed in porting relationship with the valve element and are alternately opened and closed by the valve element to provide the pressure variations which actuate the hammer. The valve element and the wall of the housing which defines the cavity forms a chamber in which a volume of the fluid is confined. The flow with respect to this volume is controlled by the hammer which communicates at least one of the pressurized hydraulic fluid supply and return means with the chamber. Hydraulic forces are thereby applied to the valve element to actuate the valve element in timed relationship with the movement of the hammer so as to provide the requisite valving action and thus sustain the oscillation of the hammer.

Figure 1:
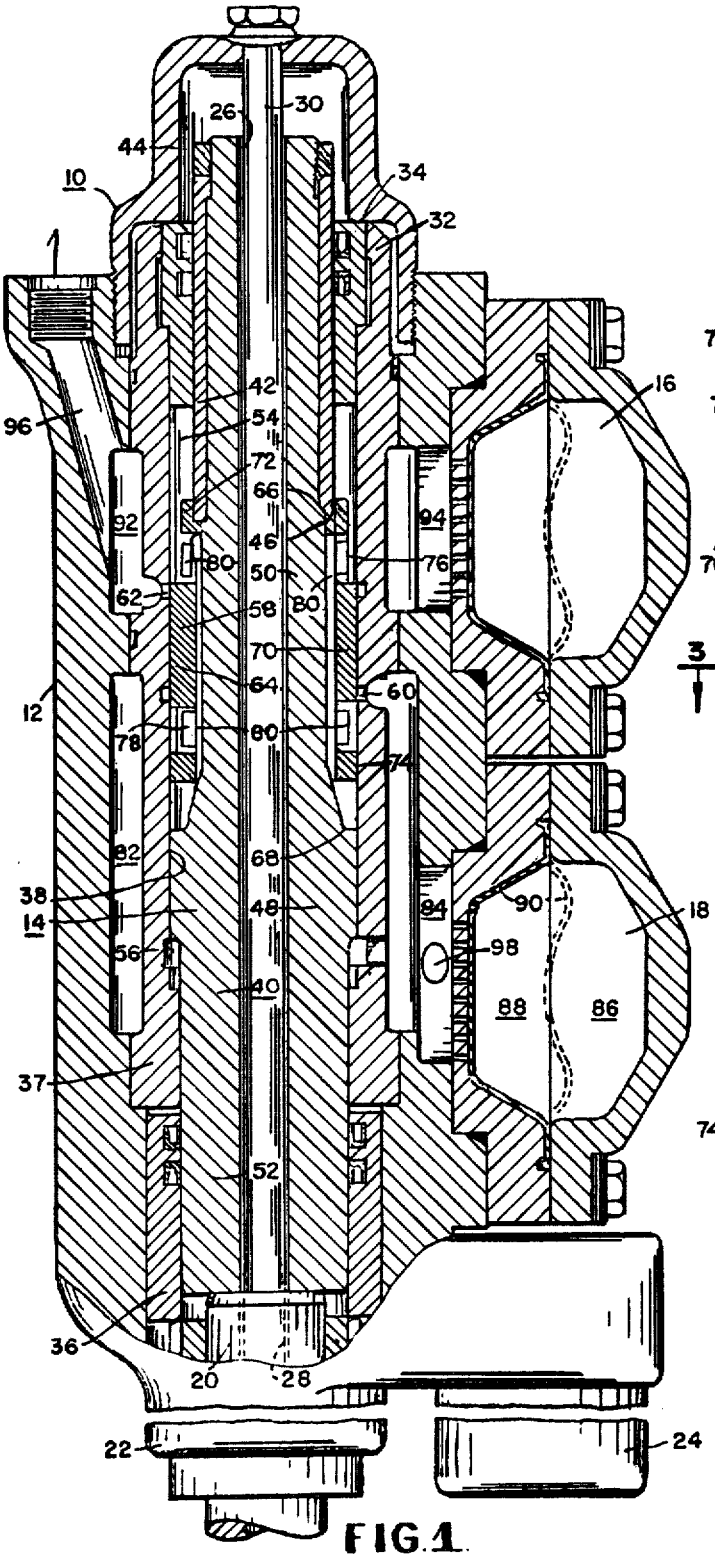
FIG. 1 is a fragmentary sectional view of an impact or percussive tool in which the invention may be embodied.
Figure 2:
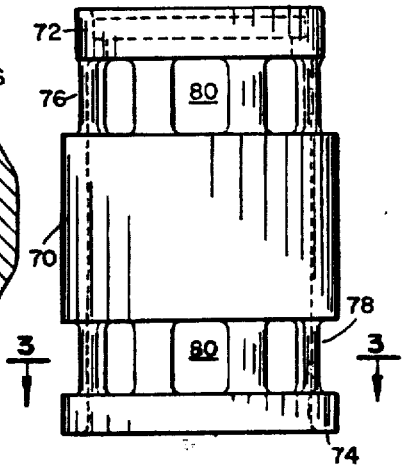
FIG. 2 is a plan view of the valve element used in the apparatus shown in FIG. 1.
Figure 3:
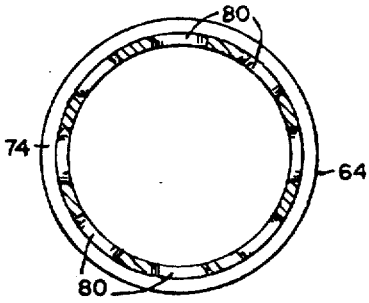
FIG. 3 is a sectional view of the valve element shown in FIG. 2, the section being taken along the line 3—3 in FIG. 2.
Figure 5:
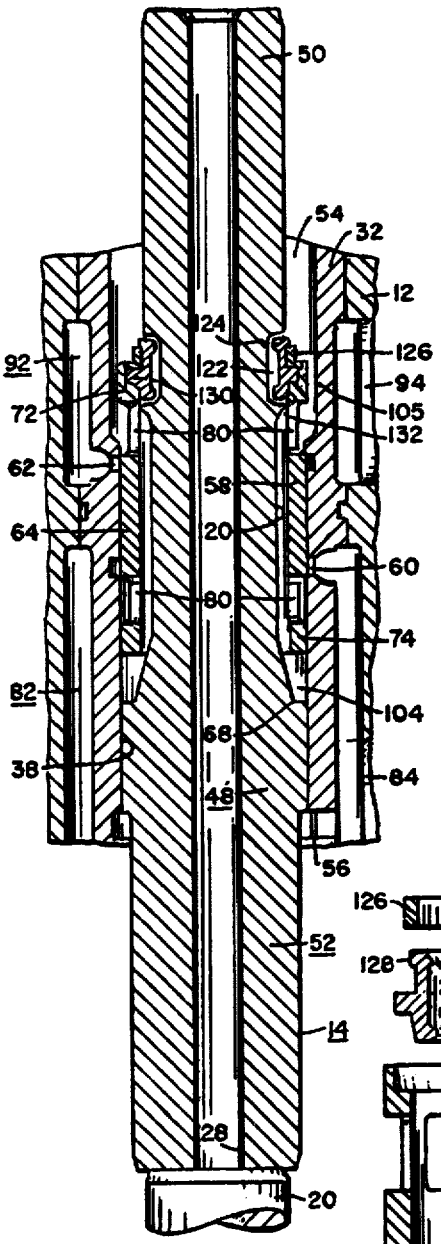
Figure 6:
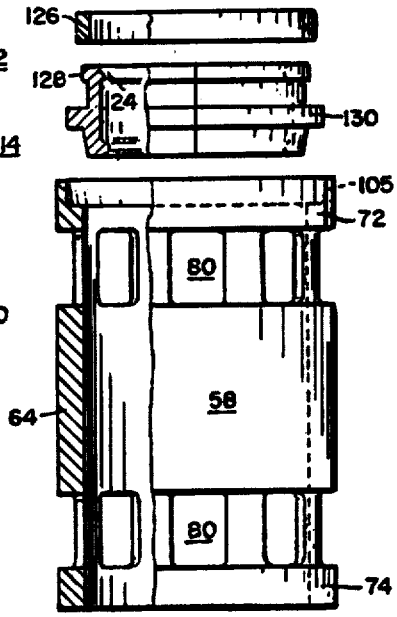
Figure 7:
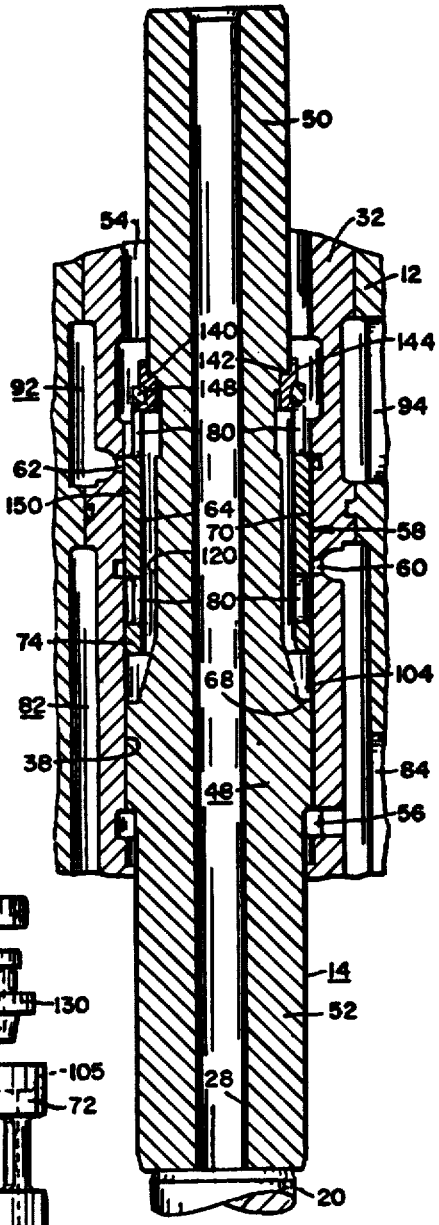
Figure 8:
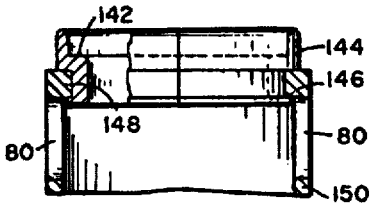
Figure 9:
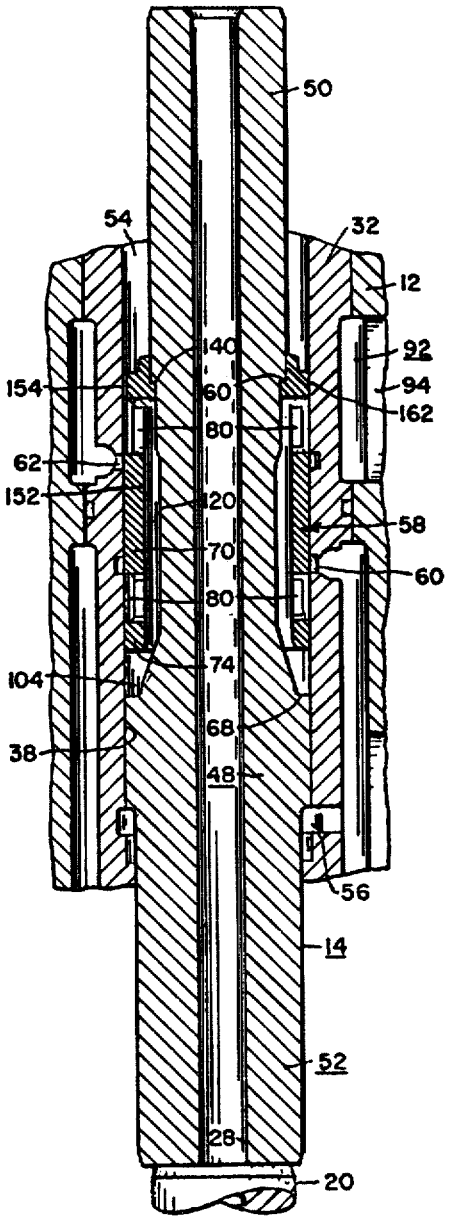
Figure 10:
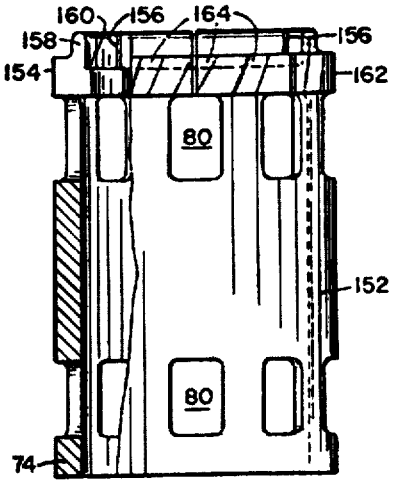
Figure 11:
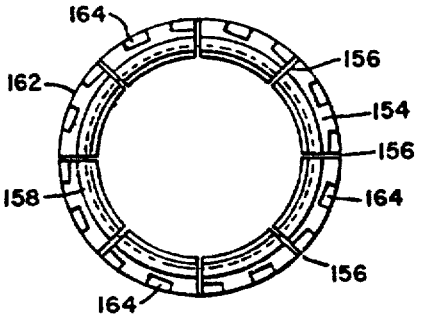
Figure 12:
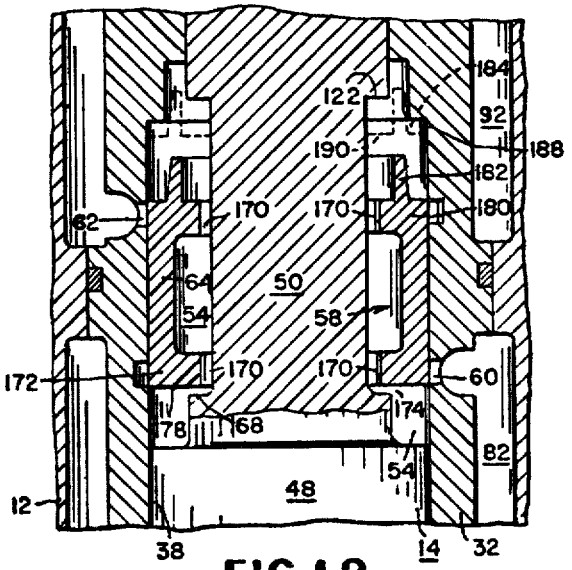
Figure 13:
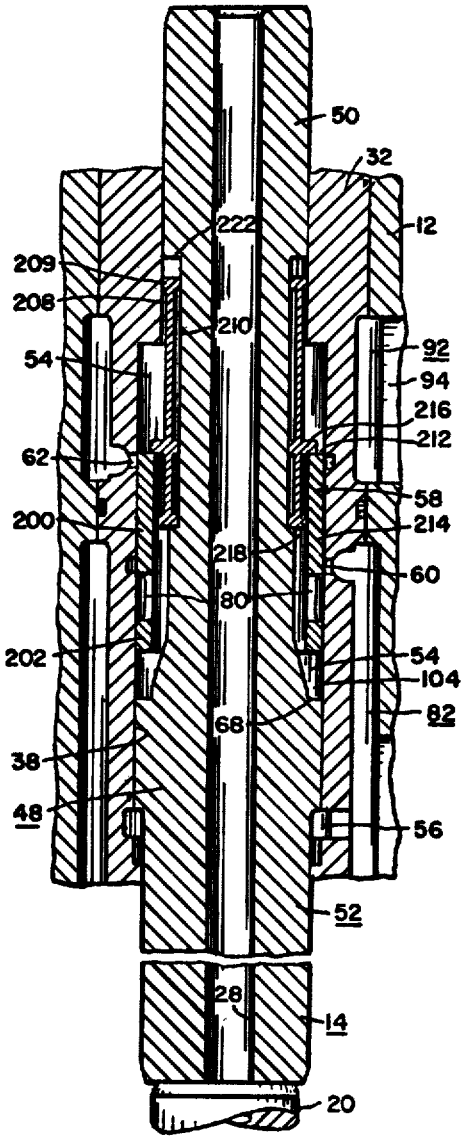
Figure 14:
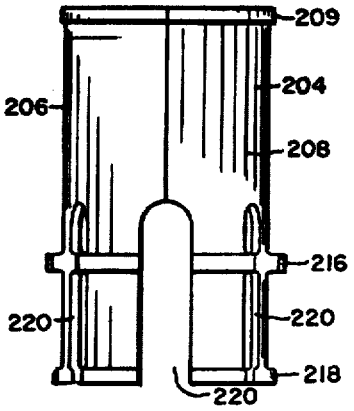
Figure 15:
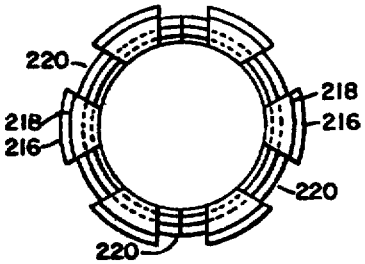
Figure 16:
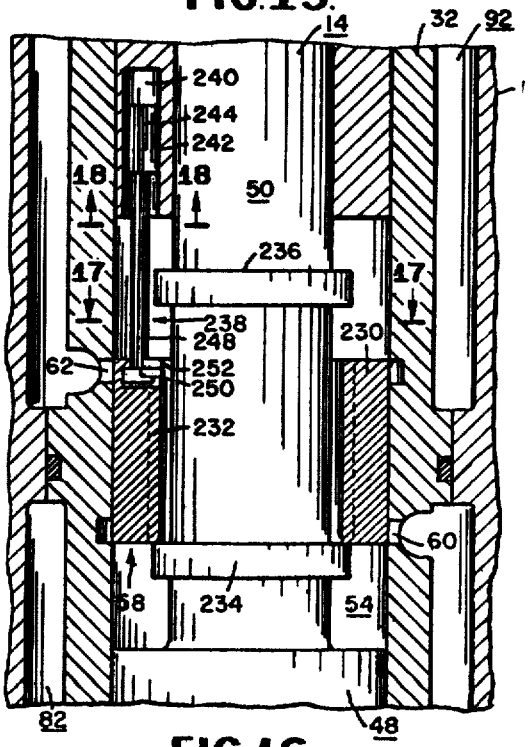
Figure 17:
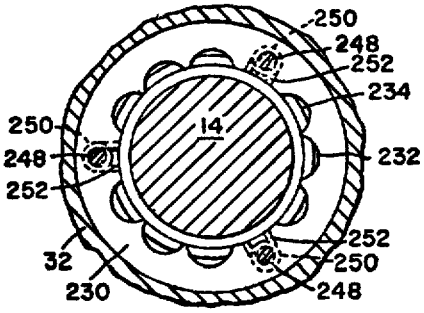
Figure 18A:
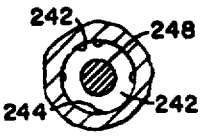
Figure 18B:
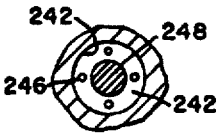
Figure 20:
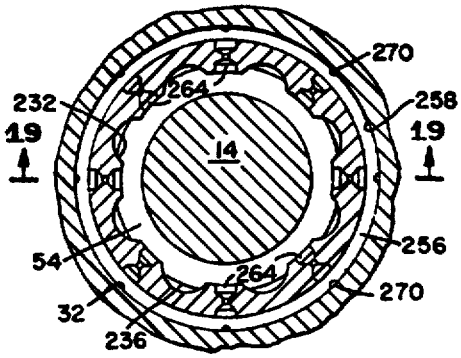
Figure 19:
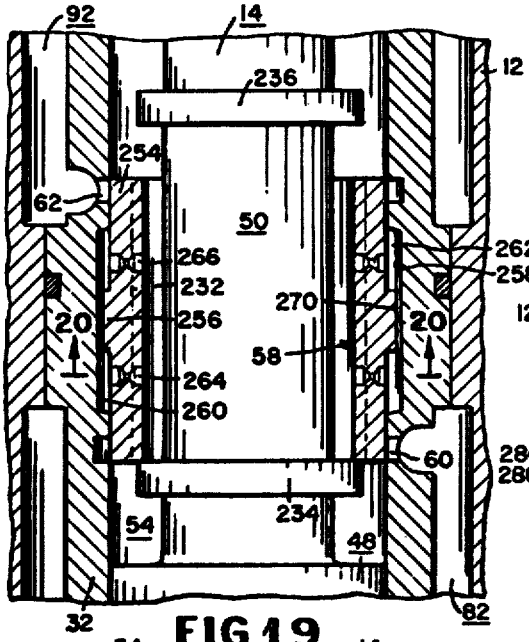
Figure 21:
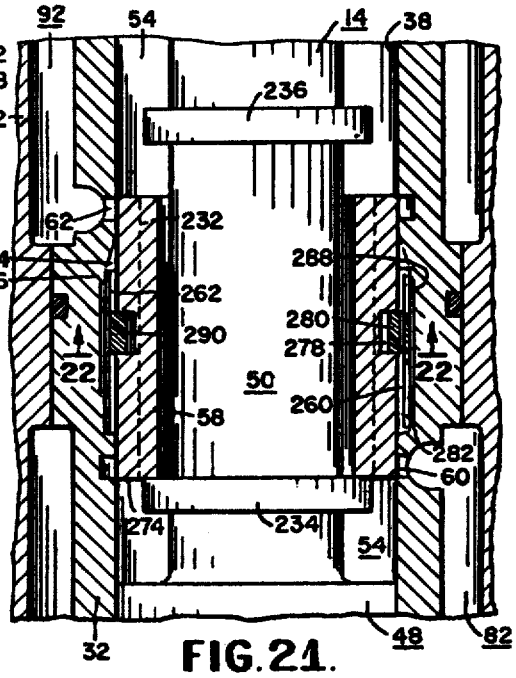
Figure 23A:
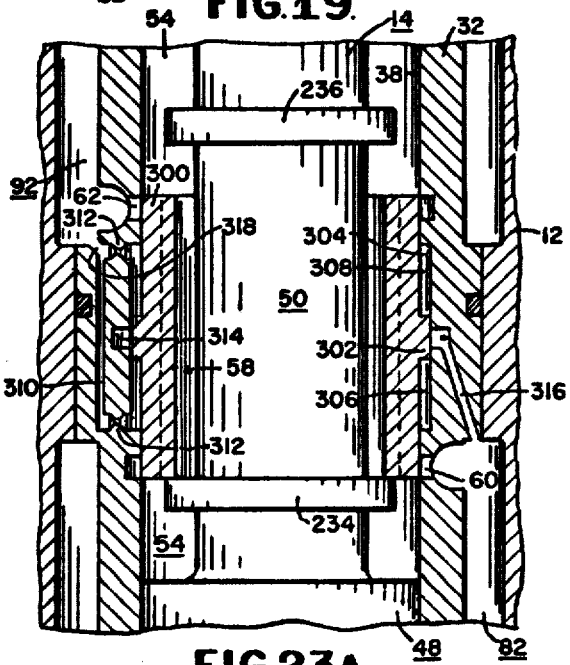
Figure 22:
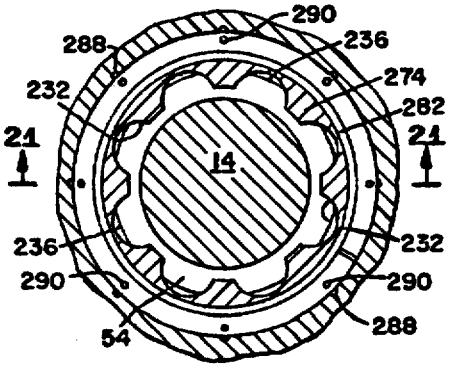
Figure 23B:
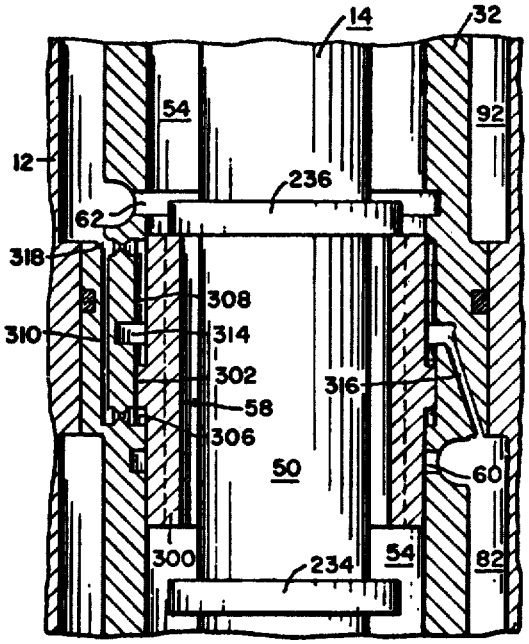
Figure 23C:
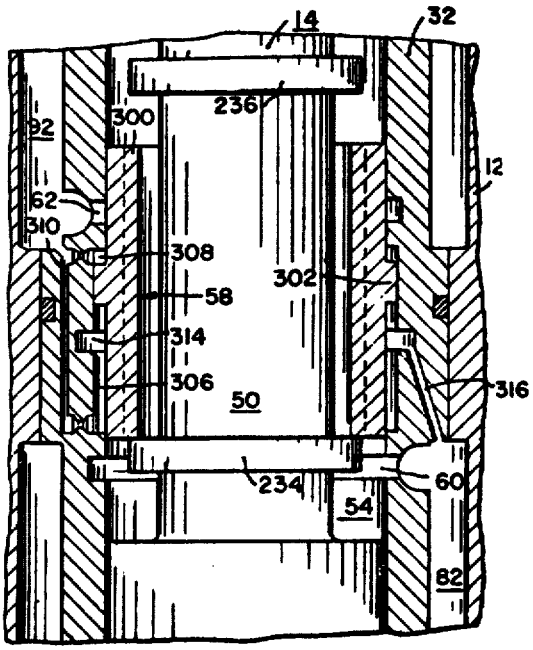
Figure 27:
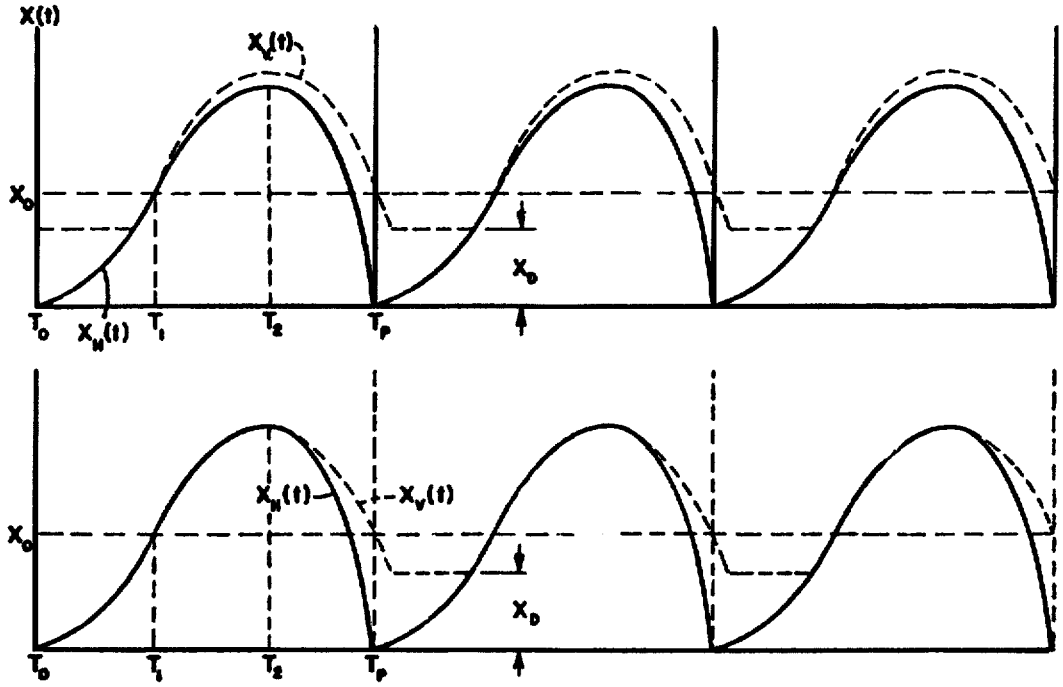
Figure 24:
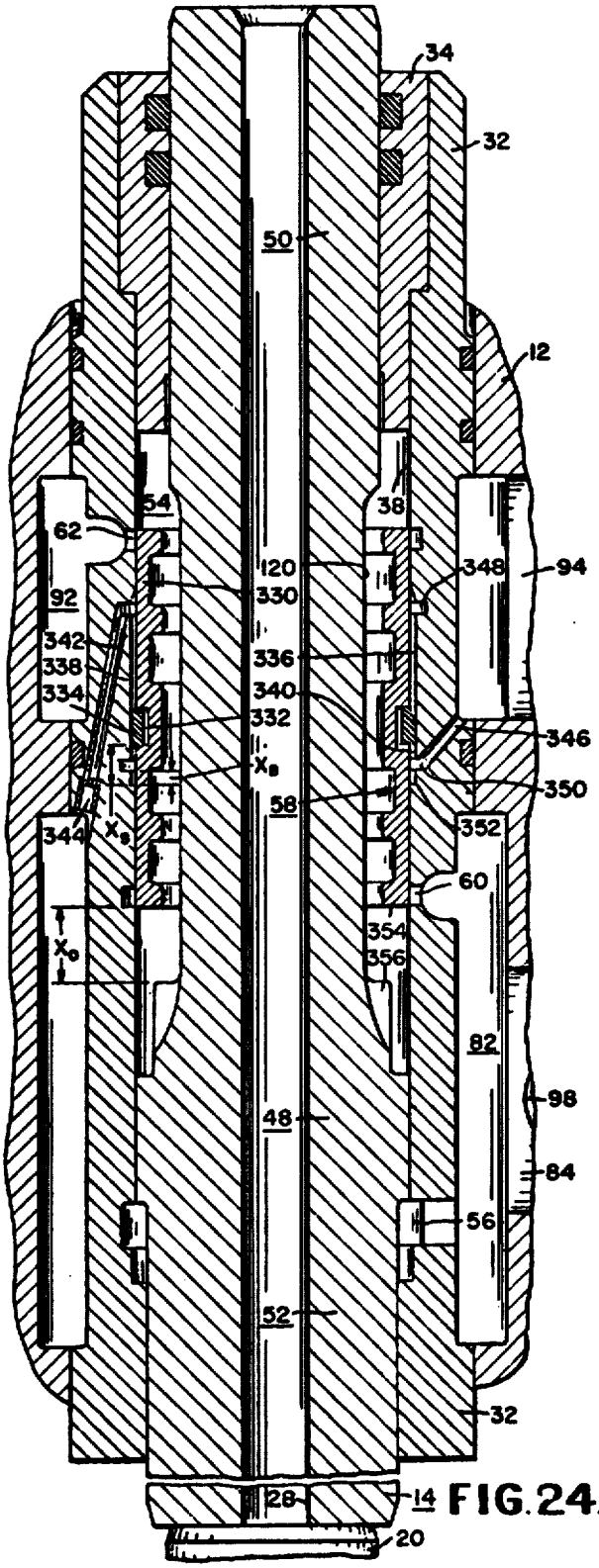
Figure 25:
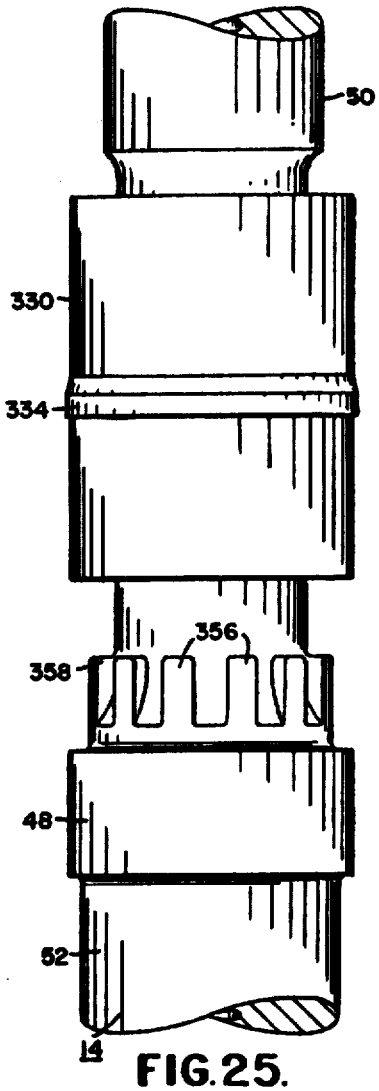
Figure 26:
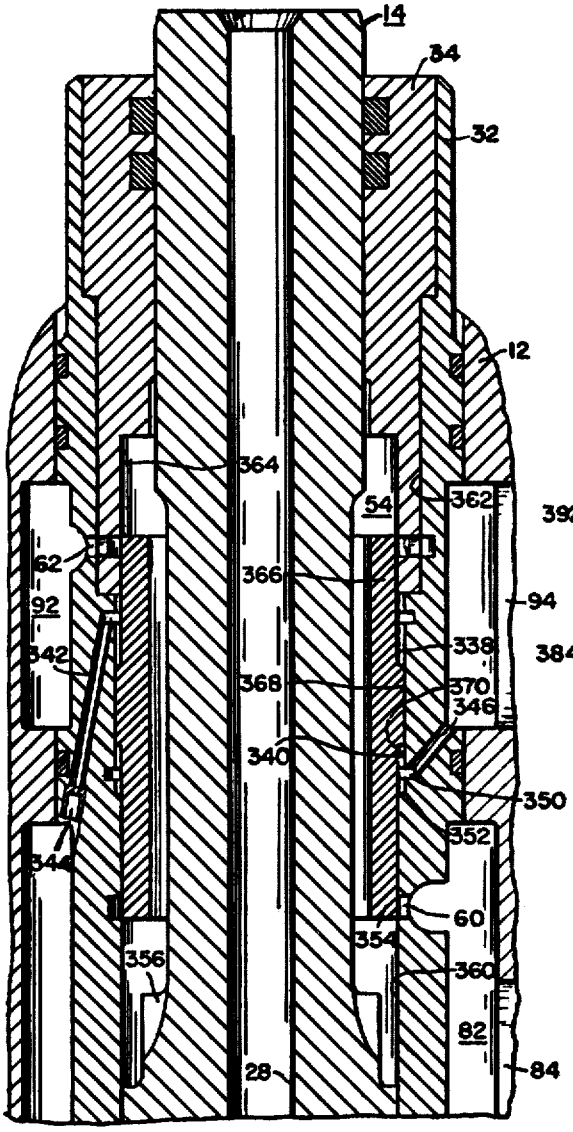
Figure 28:
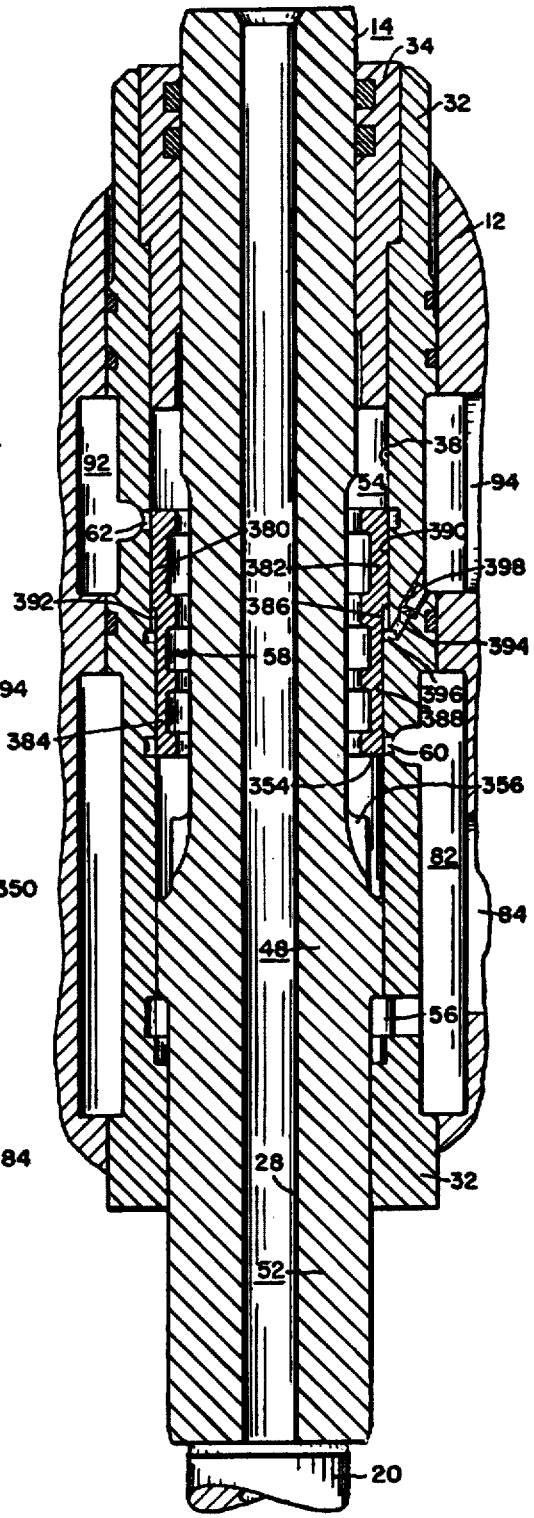
Figure 29:
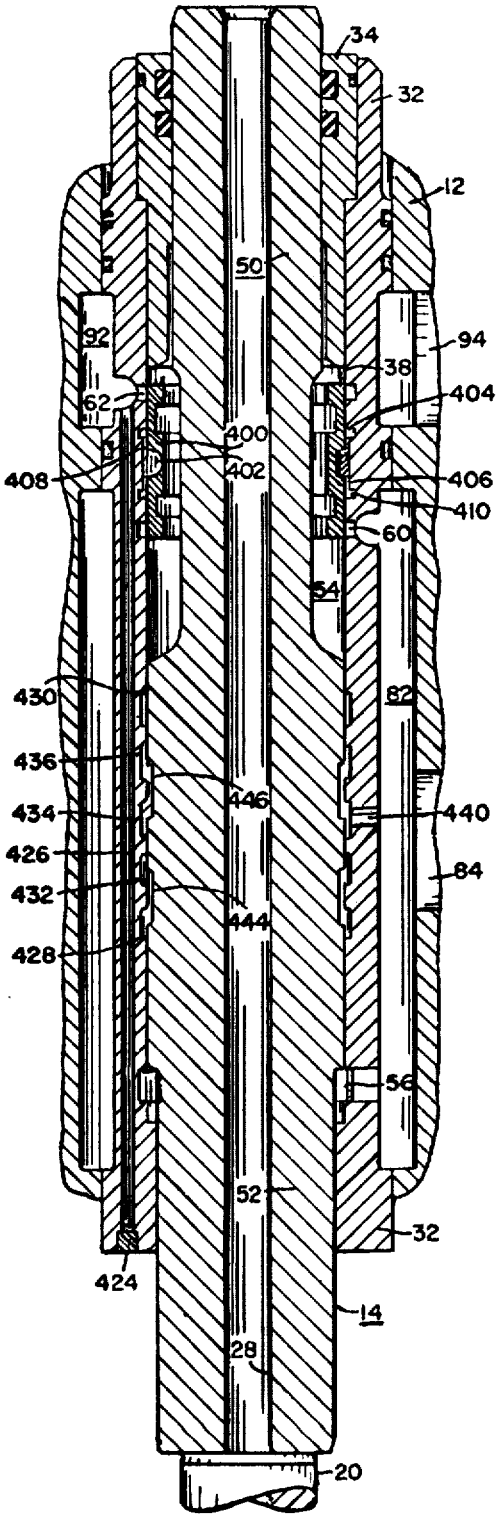
Figure 30:
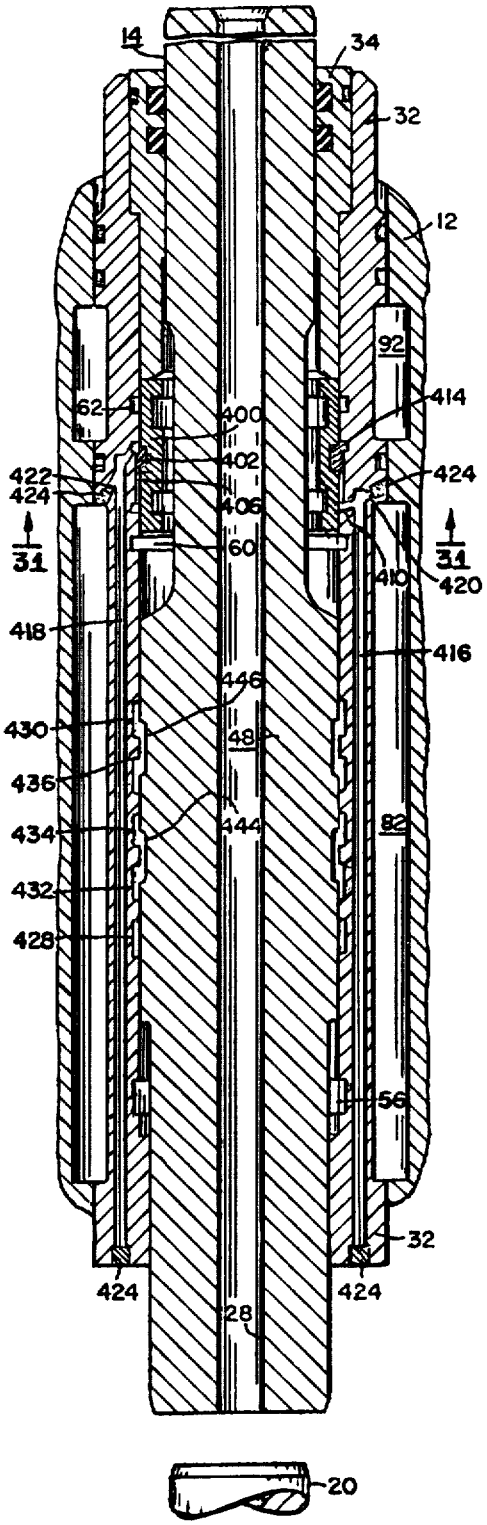
Figure 31:
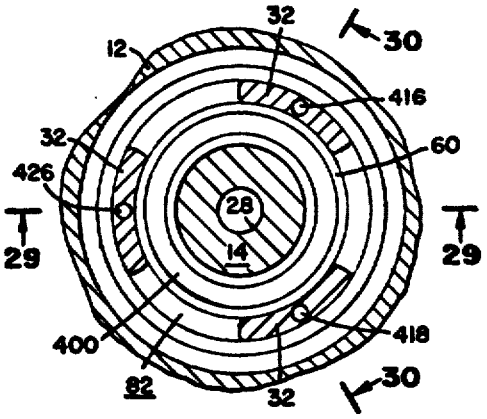
Figure 34:
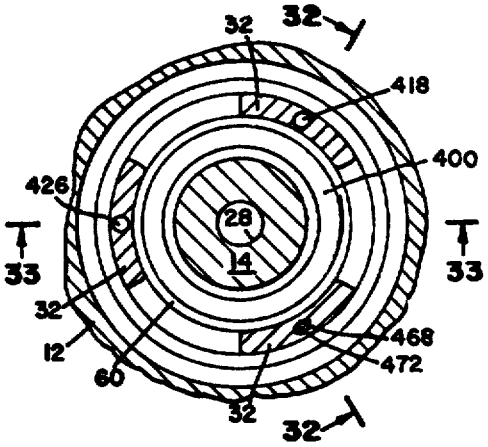
Figure 39:
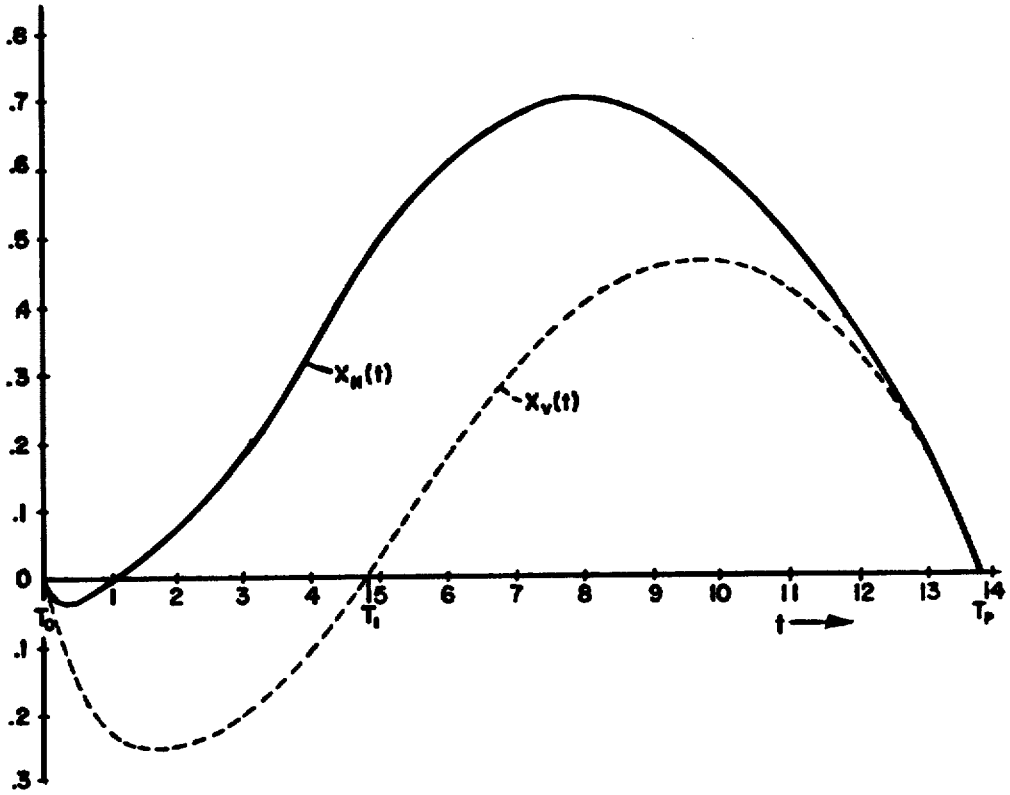
Figure 32:
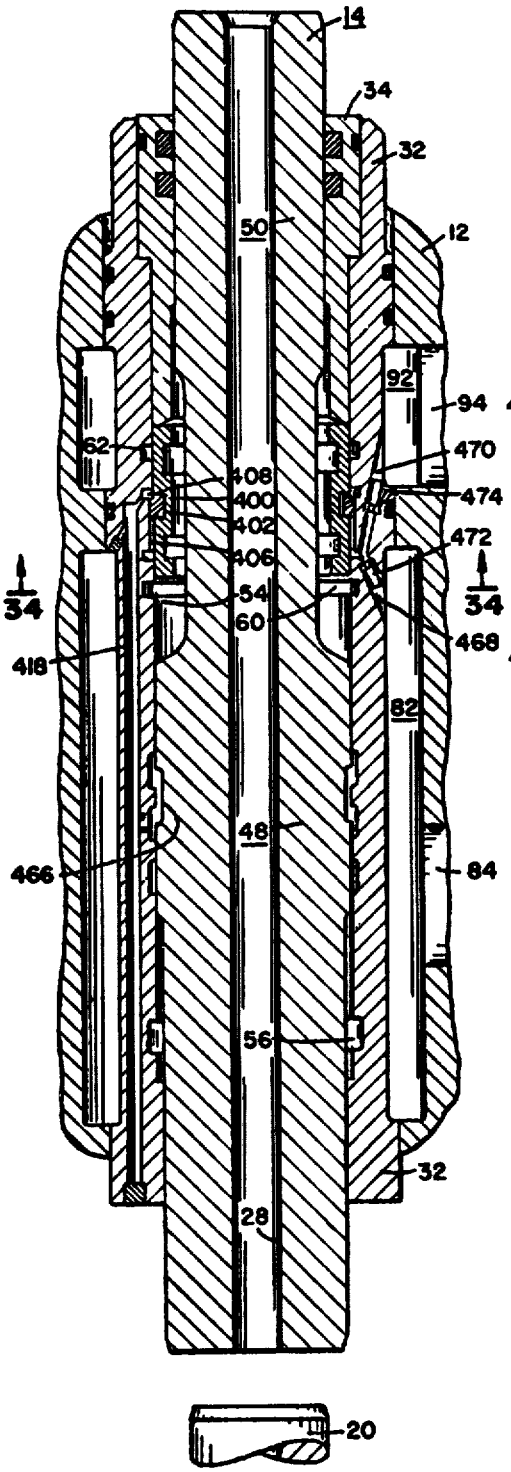
Figure 33:
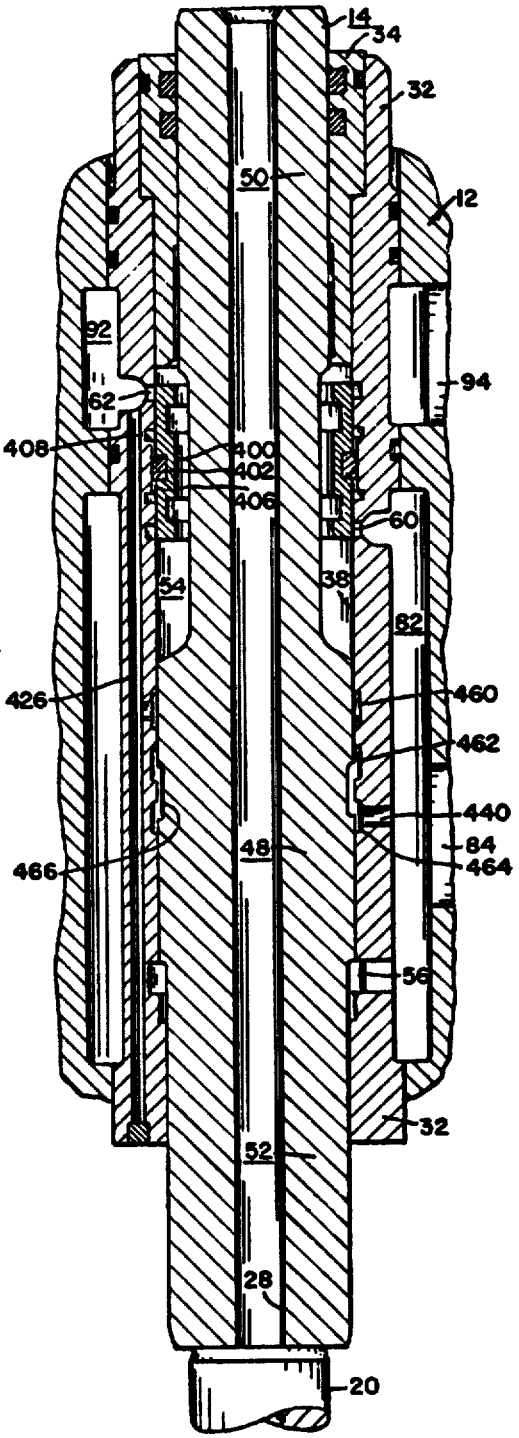
Figure 37:
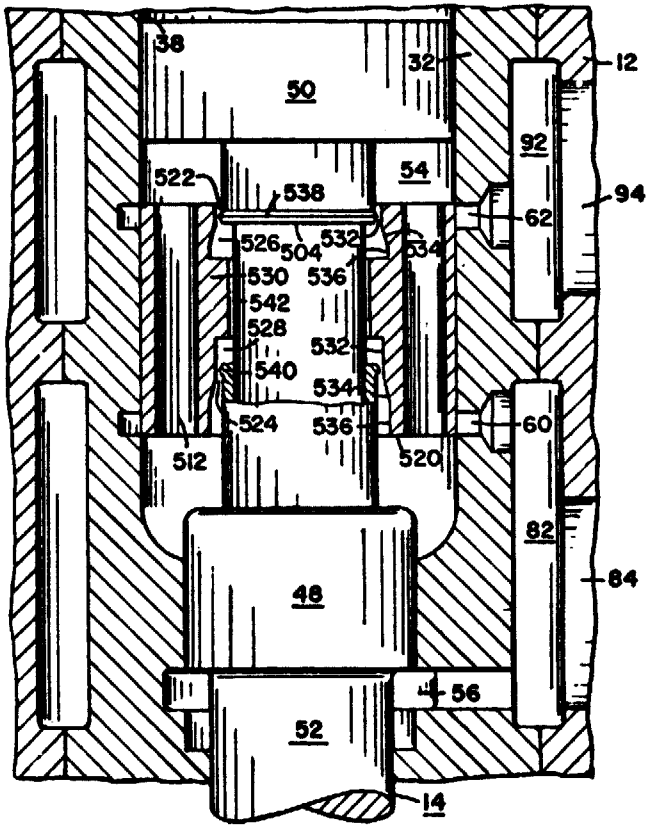
Figure 38:
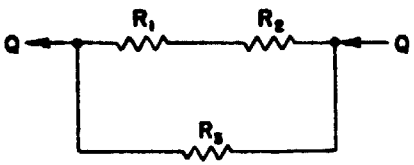
Figure 35:
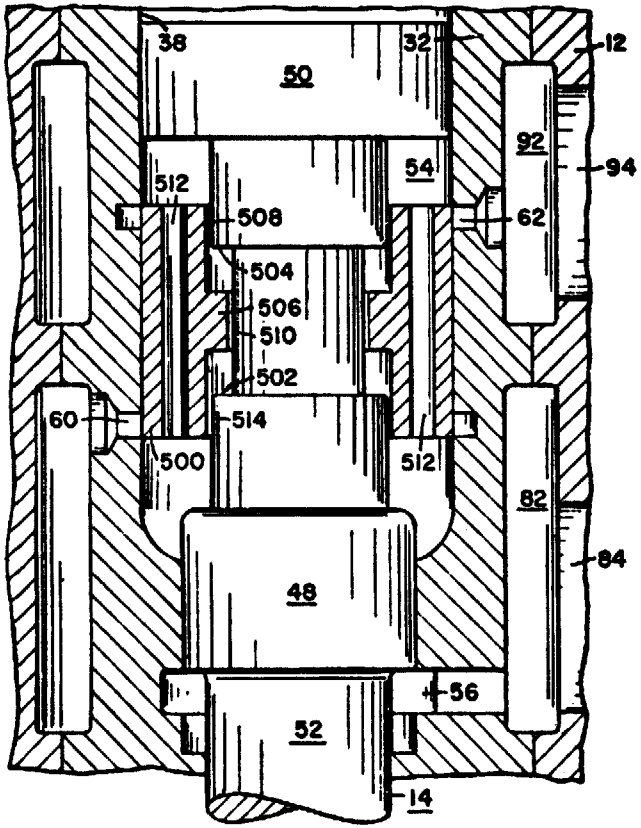
Figure 36:
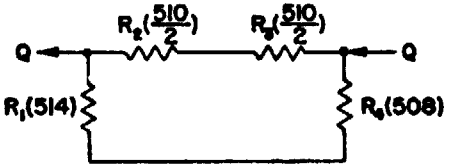

FIGS. 4(A) through 4(G) are fragmentary sectional views illustrating the valve element and hammer mass of apparatus similar to that shown in FIGS. 1 to 3;

FIG. 5 is a fragmentary sectional view of an impact tool similar to the tool shown in FIG. 1;

FIG. 6 is an exploded view illustrating in detail the valve element shown in FIG. 5 and the parts cooperating therewith;

FIG. 7 is a fragmentary section view of a tool similar to the tool shown in FIG. 5;

FIG. 8 is a fragmentary view partially in section illustrating in detail the portion of the valve element shown in FIG. 7;

FIG. 9 is a fragmentary sectional view of a tool similar to the tool shown in FIG. 5;

FIG. 10 is a more detailed view, partially in section, illustrating the valve element of the apparatus shown in FIG. 9;

FIG. 11 is an end view of the valve element shown in FIG. 10;

FIG. 12 is a fragmentary sectional view, somewhat similar to FIG. 5, illustrating the valving mechanism of another impact tool;

FIG. 13 is a fragmentary sectional view showing a tool similar to the tool shown in FIG. 5;

FIG. 14 is a detailed plan view illustrating a portion of the valve element of the tool shown in FIG. 13;

FIG. 15 is an end view of the valve element portion shown in FIG. 14;

FIG. 16 is a fragmentary section view of an impact tool illustrating another valve mechanism;

FIG. 17 is a sectional view of the apparatus shown in FIG. 16, the section being taken along the line 17—17 in FIG. 16;

FIGS. 18(A) and 18(B) are fragmentary sectional views of the apparatus shown in FIG. 16, the sections being taken along the line 18—18 in FIG. 16;

FIG. 19 is a fragmentary sectional view of another impact tool;

FIG. 20 is a sectional view of the apparatus shown in FIG. 19, the section being taken along the line 20—20 in FIG. 19;

FIG. 21 is a fragmentary sectional view of another impact tool;

FIG. 22 is a sectional view of the apparatus shown in FIG. 21, the section being taken along the line 22—22 in FIG. 21;

FIGS. 23(A), 23(B) and 23(C) are fragmentary sectional views illustrating in three different positions another impact tool;

FIG. 24 is a fragmentary sectional view similar to FIG. 5 and illustrating still another impact tool;

FIG. 25 is a fragmentary view illustrating a portion of the hammer and the valve element of the apparatus illustrated in FIG. 24;

FIG. 26 is a fragmentary sectional view similar to FIG. 5 and illustrating still another impact tool;

FIG. 27 is a series of curves depicting the time displacement history of the valve element and of the hammer illustrated in FIGS. 24 through 26;

FIG. 28 is a fragmentary sectional view similar to FIG. 5 illustrating still another impact tool;

FIG. 29 is a fragmentary sectional view similar to FIG. 5 illustrating still another impact tool, the section being taken along the line 29—29 in FIG. 31;

FIG. 30 is another fragmentary sectional view of the impact tool shown in FIG. 29, the section being taken along the line 30—30 in FIG. 31;

FIG. 31 is a sectional view taken along the line 31 in FIG. 30;

FIG. 32 is a fragmentary sectional view similar to that of FIG. 5, illustrating still another impact tool;

FIG. 33 is another sectional view of the tool illustrated in FIGS. 32 and 34, the view being taken along the line 33—33 in FIG. 34;

FIG. 34 is a sectional view of the tool shown in FIGS. 32 and 33, the view being taken along the line 34—34 in FIG. 32;

FIG. 35 is a fragmentary sectional view of still another impact tool;

FIG. 36 is a schematic diagram illustrating the hydraulic circuit provided by the valve mechanism of the apparatus shown in FIG. 35; and FIG. 37 is a view similar to FIG. 35 illustrating still another impact tool;

FIG. 38 is a schematic diagram of the hydraulic circuit afforded by the valve mechanism of the apparatus shown in FIG. 37; and FIG. 39 is a series of curves illustrating the time displacement characteristics of the valve element and hammer of the impact tool shown in FIGS. 36 through 38.

The inventions of the above referenced simultaneously filed applications are embodied in the apparatus illustrated in the accompanying drawings as set forth below:

1. John V. Bouyoucos, Application Ser. No. 522,978, FIGS. 12; 16; 19 and 20; 21 and 22; 23A-23C; and all of the other FIGS. to which features of the invention of this application are generic.

2. John V. Bouyoucos, Roger L. Selsam and Robert O. Wilson, Application Ser. No. 522,823, FIGS. 1-3, 4A, 4B and 4E; 4C; 4F; 4G; 5 and 6; 7 and 8; 9-11; and 13-15.

3. John V. Bouyoucos, Roger L. Selsam and Dennis R. Courtright, Application Ser. No. 522,977 (this application), FIGS. 24 and 25; 26; 28; 29 to 31; and 32 to 34.

4. Boyd A. Wise, Application Ser. No. 522,824, FIGS. 35 and 36; and FIGS. 37 and 38.

Referring to FIGS. 1, 2, 3, 4(A), 4(B) and 4(E), there is shown an impact tool 10 having a housing 12. Such tools are also known as percussive tools. The tool contains a hydroacoustic oscillator which includes a mass which provides the hammer 14 of the impact tool and a hydraulic spring system provided by accumulators 16 and 18 and various fluid filled galleries and cavities in the housing 12. The hammer 14 oscillates in a central opening within the housing 12 and impacts upon a shank 20. The shank is part of an anvil system which transmits the force pulses created by the impact of the lower end of the hammer upon the shank to a load which may be a drill steel and rock bit engaged with a rock interface. A chuck assembly 22 holds the shank for rotation by means of a hydraulic motor 24. Reference may be had to U.S. Pat. No. 3,640,351, issued Feb. 8, 1972 for further information respecting the design of the shank 20 and chuck assembly. The above-referenced patent also discusses the use of passages such as the bores 26 and 28 in the hammer 14 and shank 20 in which a tube 30 is located for the passage of cleansing fluid, suitably air or water, for flushing and cleaning the holes drilled by the tool. The above-referenced patent applications Ser. Nos. 285,240; 463,265; and 463,626 may also be referred to for further information respecting the design and operational characteristics of impact tool similar to that shown in FIG. 1.

A sleeve 32 in the housing together with insert sleeves 34 and 36 define a stepped opening through the housing which includes a cylindrical bore 38 having a stepped portion 37 in the bore 38. The hammer 14 oscillates along the axis of the bore 38 with the inner surfaces of sleeve 34 and stepped portion 37 providing bearing surfaces for such longitudinal hammer oscillation.

The hammer 14 is constructed in three parts, namely a main hammer body 40, a sleeve 42 and a retaining nut 44. The sleeve 42 is compressed against the shoulder 46 by the nut 44. The longtitudinal compliance of the sleeve 42 permits the sleeve to be maintained in compression against the shoulder 46 by the nut 44, and enables a pre-loading which, even in the presence of substantial compressional and tensional stress waves resulting from hammer impact, keeps the hammer parts assembled in unitary relationship.

The hammer 14 has a central stepped section 48 in the main hammer body 40 of a diameter which is larger than the diameter of the sleeve 42 attached to the upper portion 50, and which is also larger than the diameter of the lower portion 52 of the main hammer body 40. The lower portion 52 has a larger diameter than the sleeve 42 attached to the upper portion 50 such that the hammer presents, in a plane normal to the axis of hammer motion, a larger area to an upper or first cavity 54 in the bore 38 than to a lower or second cavity 56 therein. The first cavity 54 functions as a drive cavity in which pressure variations are developed for sustaining the oscillation of the hammer 14. The cavity 54 includes a valve mechanism 58 for switching the fluid pressure therein from supply to return while the second cavity 56 is exposed to the supply pressure at all times.

The valve mechanism 58 consists of a supply port 60, a return port 62, and a valve element 64 which engages the lower end 66 of the sleeve 42 and upper face 68 of the hammer central section 48, all in the drive cavity 54. The ports 60 and 62 are provided by peripheral grooves which extend circumferentially around the inner wall of the bore. Much of the cross section of the sleeve 32 contains lateral openings which communicate the grooves with galleries 82 and 92. The valve element 64 is a cylindrical structure having a central body portion 70 of outer diameter approximately equal to the inner diameter of the bore 38. The central body 70 of the valve 64 extends between the ports 60 and 62. The opposite edges of the central body 70 provide porting edges which open and close the ports as the valve element slides within the bore 38 coaxially with respect to the hammer 14. Between the central body and the ends 72 and 74 of the valve element 64 are relieved sections 76 and 78, each with a multiplicity of radial passages 80.

The second cavity 56 and the supply port 60 are in communication by way of the longitudinal gallery 82 which extends therebetween. This gallery 82 is also in communication with the accumulator 18 and it is connected thereto by way of a lateral opening 84. The accumulator 18 is divided into two sections 86 and 88 by a flexible diaphragm 90. The section 86 may be filled with a compressible fluid (e.g. a gas such as air) through a valve not shown. The inner section 88 is filled with hydraulic fluid during operation of the tool which fluid enters through the array of holes in the forward wall of the section 88. When the accumulator is filled with hydraulic fluid and gas at operating pressure levels, the diaphragm 90 assumes the position shown by dash lines in the drawing. The accumulators act as energy storage means in the hydraulic spring system of the oscillator.

Another gallery 92 encompasses the upper end of the first or drive cavity 54 and is in communication with the return port 62. The gallery 92 is connected by a large opening 94 to the accumulator 16. The accumulator 16 is similar to the accumulator 18.

A channel 96 is connected to the return gallery 92 and a similar channel 98 is connected in the lateral opening 84 to the supply gallery 82. These channels are a part of the means for conveying pressurized hydraulic fluid at supply and return levels to and from the tool. U cups and O ring seals, respectively for sliding surfaces and stationary surfaces are shown to seal the cavities and fluid channels in the housing 12.

Consider the operation of the tool 10. FIG. 1 shows the tool at that point in the cycle of oscillation just at the instant of impact of the hammer with the shank (viz. when the lower end of the hammer 14 reaches the impact position). Immediately after impact the valve element 64 will travel downward somewhat from the position shown in FIG. 1 so that immediately after impact the supply port 60 is closed and the return port open. Then during the first portion of the cycle from $T_0$ to $T_1$ (see FIG. 27), pressurized fluid is applied to the lower cavity 56 while the drive cavity 54 is opened to return by the valve mechanism. The ratio of the area of the hammer 14 which is exposed to the drive cavity 54 and which is in a plane normal to the axis along which the hammer moves to the normal area of the hammer exposed to the lower cavity 56 is preferably about 2:1. The pressurized fluid acting upon the lower face of the central section 48 then drives the piston upwardly in a direction away from the impact position. When the upper face 68 of the hammer central section 48 engages the lower end 74 of the valve element 64 and raises the valve element to the position shown in FIG. 1, switching of pressure from return to supply occurs in the drive cavity 54. Pressurized fluid is then applied to both the lower and drive cavities. The net force on the hammer now reverses and is in a direction towards the shank 20. The return port 62 is closed. The initial momentum of the hammer 14 at time $T_1$ enables the hammer to be carried to the limit of its upward stroke or displacement. The kinetic energy of the hammer is stored, when the hammer reaches the upward limit of its displacement at time $T_2$ (FIG. 27), in the accumulator 18 as well as in the cavities and galleries and channels associated therewith. The hammer is then driven downwardly during the period $T_2$ to $T_p$ over the entire displacement or downward stroke back to the impact position. During the downward stroke the lower end 66 of the sleeve 42 engages the upper end 72 of the valve element 64 and brings the valve element to the position shown in FIG. 1 after which the return port 62 is opened and the supply port 60 is closed causing the cycle to repeat. The energy stored in the accumulator 18 and its associated cavities, galleries and channels, is transferred during the period $T_2$ to $T_p$ into percussive forces which are transmitted to the shank 20 and may from the shank be transmitted via a drill steel to a bit for rock drilling or other purposes.

Figure 4A:
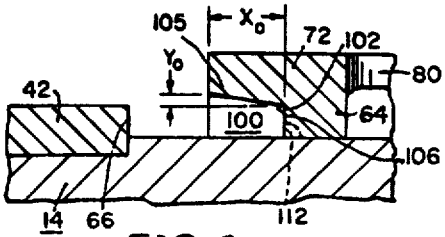
Figure 4B:
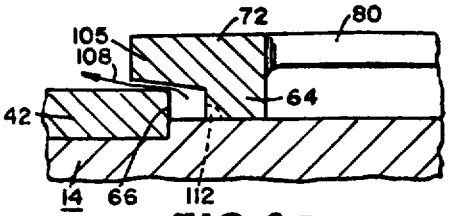

There is provided between the hammer 14 and the valve element 64 means whereby volumes of hydraulic fluid are confined when the hammer engages the ends 72 and 74 of the valve element. It will be noted that the degree of confinement during such engagement may be partial. The term confined volume as used herein should be taken to include such partially confined volume. The confined volumes, as are more clearly shown in FIGS. 4(A), 4(B) and 4(E) are pockets 100 and 104. The upper pocket 100 is formed by the end 66 of the sleeve 42 and a notch 102 in the end 72 of the element 64. The pocket 104, which is formed between the opposite end 74 of the element 64 and the upper face of the central section 48 of the piston 14, provides the other part of the volume of fluid which is confined between the valve element 64 and the hammer 14. Each of the pockets 100 and 104 includes tapered surfaces which aid in controlling the rate of displacement of fluid into and out of the pockets, and, concurrently, the forces imposed on the valve element 64. The valve element 64 or the hammer 14, including an associated part thereof such as the sleeve 42, may have a tapered portion which defines one surface of a pocket. The taper should control the size of the openings between the valve element and hammer which are disposed in overlapping relationship. In FIGS. 4(A) and 4(B) for example, the portion of the end 72 of the valve element 64 which forms the notch 102 includes a lip 105 which overlaps the end 66 of the sleeve 42 as the hammer 14 moves into engagement with the valve element end 72. The surface of the lip 105 which overlaps the sleeve 42 is tapered outwardly away from the notch end 106 which engages the sleeve end 66. The inner periphery of the lip 105 is therefore a conical surface.

As the lip 105 begins to overlap the end 66 of the sleeve 42, fluid must be forced out of the pocket 100 as shown by the arrow 108 in FIG. 4(B). This fluid then passes through the trapezoidal orifice region defined by the tapered, conical surface of the lip 105 and the cylindrical outer periphery of the sleeve 42. The resistance to flow through the orifice region increases, providing forces on the parts which are a function of the rate of taper and velocities of the parts. These forces control the relative motion of the valve element with respect to the hammer and damp the motion of the valve element 64 so as to prevent erratic motion which may be manifested as uncontrolled rebounding when the hammer engages the valve element end.

Figure 4C:
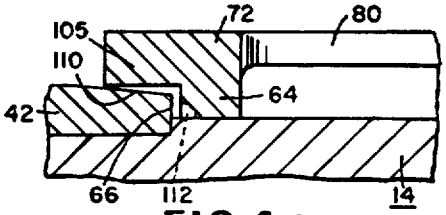

As shown in FIG. 4(C) the cylindrical surface 110 at the end 66 of the sleeve 42 may be tapered inwardly rather than tapering the surface of the lip 105 on the valve element end 72. In order to keep the hydraulic resistance due to squeeze films from becoming excessive and overriding the damping effects of the trapezoidal orifice, an auxiliary pocket 112 may be provided as by a chamfer or notch in the inner end of the notch 102 in the valve element end 72.

Figure 4D:
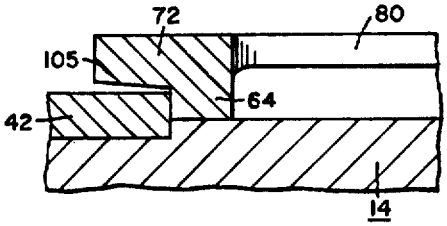
Figure 4E:
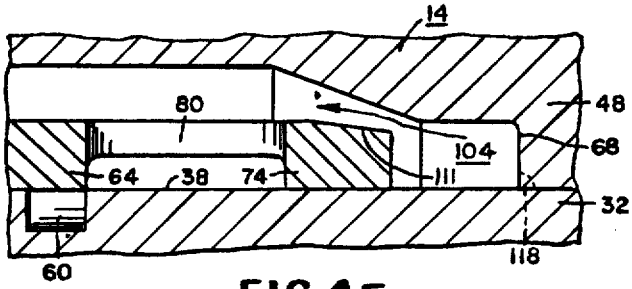

As shown in FIG. 4(D) the diameter of the hammer 14 at the outer periphery of the sleeve 42 may be made somewhat smaller than the smallest inner diameter as provided by the tapered portion of the lip 105. This provides additional clearance which in some applications may be useful when the hammer 14 does not easily become disengaged from the valve element end 72.

Figure 4F:
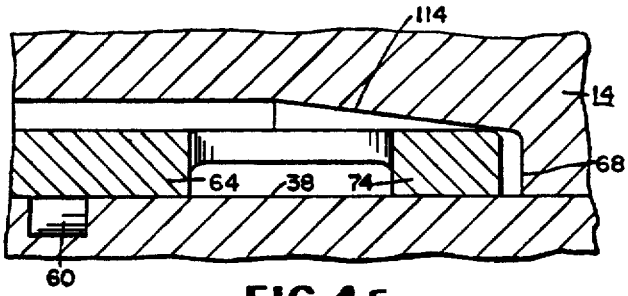
Figure 4G:
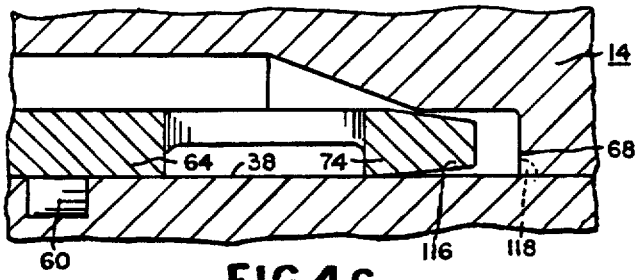

As shown in FIG. 4(E) the pocket 104 is provided with a taper by tapering the inner surface 111 of the valve element end 74 inwardly towards the bore 38. Alternatively, as shown in FIG. 4(F), the tapered portion may be a tapered surface 114 on the hammer 14. As shown in FIG. 4(G) the outer peripheral surface 116 of the valve element end 74 may be tapered. The tapered surface 116 has the additional advantage of providing a tapered bearing tending to center the valve element relative to the bore 38. Notches 118 may be provided in the hammer end surfaces 68, if desired, to avoid a squeeze film resistance effect overriding the orifice damping effects in the limit as the valve element end 74 moves into engagement with the hammer 14.

The length of the tapered surface which forms one surface of the orifice for fluid flow into and out of the pocket 100 or 104 (viz, the length of the overlap between the valve element and the hammer), the rate of the taper and the ultimate clearance provided in the pocket formed when full overlap occurs, all determine the damping effect by controlling the forces which decelerate the valve element in its engagement with the hammer as well as the acceleration of the valve element during its engagement with the hammer in the next portion of the cycle of oscillation of the hammer. It is desirable to decelerate the valve without applying such forces or stresses thereto as to cause the valve element to rebound uncontrollably from the hammer or execute other erractic motion. The tapered confined volume as provided in the impact tool shown in FIGS. 1 through 4 advantageously limits the magnitude of the forces and stresses.

Consider the operation of the tapered portion in limiting the peak forces to a maximum force $F_o$ which is maintained constant over a distance $X_o$ which is the length of the overlap, for example the length of the lip 105 or the tapered inner periphery 111 of the end 74, as shown in FIG. 4(E). Consider further that the valve element of mass M has an initial velocity relative to the hammer upon entering the pocket of $v_o$. The difference in diameters at each end of the tapered portion is $Y_o$. The distances $X_o$ and $Y_o$ are indicated in FIG. 4(A). Then, for a constant decelerating force $F_o$, the relative velocity of the valve element with respect to the hammer must be of the form $$v = v_o - \int_o^t \frac{F_o}{M}\,dt = v_o - \frac{F_o}{M}\,t \tag{1}$$

The displacement of the valve element with respect to the hammer may be expressed as follows:

$$X = \int_o^t v\,dt = v_o t - \tfrac{1}{2}\frac{F_o}{M}\,t^2 \tag{2}$$

By combining terms of these equations it may be observed that the travel time of the valve element into the pocket is the following function of its mass, the decelerating force and the velocities $$t = \frac{M}{F_o}(v_o - v) \tag{3}$$

By combining terms the displacement may be expressed as follows:

$$X = \tfrac{1}{2}\frac{M}{F_o}\,v_o^2 - \tfrac{1}{2}\frac{M}{F_o}\,v^2 \tag{4}$$

The velocity may also be expressed as a function of the displacement $$v = \left(v_o^2 - 2\frac{F_o}{M}X\right)^{\frac{1}{2}} \tag{5}$$

For the case when the relative velocity becomes zero when the displacement is just equal to the length of the pocket $X_o$, $F_o$ becomes $$F_o = \frac{M}{2X_o}\,v_o^2 \tag{6}$$

The velocity of the valve element is therefore a function of the initial velocity and the displacement as may be obtained by combining equations (5) and (6)

$$v = v_o\left(1 - \frac{X}{X_o}\right)^{\frac{1}{2}} \tag{7}$$

Now the pressure in the pocket is a function of the fluid dynamics and may be expressed as follows:

$$P = \frac{\rho}{2}\left(\frac{C_D v A}{\pi y}\right)^2 \tag{8}$$

Where p is equal to the fluid density, $C_D$ is the orifice contraction coefficient, A is the area of the pocket in a direction normal to the direction of motion, and Y is the width of the orifice formed by the tapered portion of the pocket where it overlaps the incoming end of the valve element or the hammer as the case may be (FIG. 4(A) shows the hammer to be the incoming element). The decelerating force is then pressure multiplied by the area of the pocket normal to the direction of motion and may be expressed as follows:

$$F = \frac{\rho}{2}\left(C_D \frac{v}{\pi y}\right)^2 A^3 \tag{9}$$

Equation (7) shows the velocity condition for uniform deceleration and constant force. It will be apparent that if the orifice width Y could be of a form corresponding to equation (7) then the decelerating force as given by equation (9) will be a constant and independent of the relative displacement of the valve element and the hammer. Thus, if y were expressed as follows $$y = y_o\left(1 - \frac{X}{X_o}\right)^{\frac{1}{2}} \tag{10}$$

then the decelerating force will be constant and only a function of the physical characteristics of the fluid and the part dimensions. Equation (10) expresses the contour of the taper as function of overlap X that would give a prescribed constant decelerating force $F_o$ on the valve for an initial engagement velocity $v_o$, the valve being brought to rest relative to the hammer over a travel distance $x_o$. Equation (10) indicates a parabolic taper, which may be employed. Other tapers and other force-time relationships can be employed, the object being to employ the volume of fluid confined between the valve element end and hammer (or housing) to suitably control (as by damping), the motion of the valve element. By proper choice of damping, erratic motion of the valve can be minimized or eliminated, and a controlled valving cycle achieved. Such controlled damping can also provide for controlled forces and, hence, stresses on the mechanical parts to minimize problems of mechanical fatigue. Whereas attention in the above design description has been devoted to the deceleration times and forces upon engagement, the same considerations apply to the controlled disengagement of the parts as, for example, when the hammer impacts the shank, and the valve element continues its motion to cause switching of the supply and return ports.

Referring to FIG. 5 there is shown another impact tool wherein parts, which are similar in construction and operation to the tool shown in FIGS. 1 through 4, are indicated by the same reference numerals as used to indicate like parts in FIGS. 1 through 4. Similarly, like parts are indicated by like reference numerals in the remaining figures of the drawings.

In FIG. 5 the upper end 50 of the hammer 14 is relieved as shown at 120. A circular groove 122 immediately above the relieved section 120 receives a split ring 124 (see also FIG. 6). The slit ring 124 is locked in place by another ring 126 which is press fit over the split ring 124 and is locked in place by lip 128 on the split ring 124 (see FIG. 6). An extension 130 diametrically outward from the split ring 124 provides a step which performs the function similar to the end 66 of the sleeve 42 (FIG. 1). The step 130 provides, with the tapered portion 105 of the end 72 of the valve element 64, the pocket 100. The other end 74 of the valve element 64 and the shoulder 68 on the central section 48 of the hammer 14 provides the other pocket 104. A small clearance 132 is provided between the groove 122 and the split ring 124 which assists the alignment of the step 130 with the valve element end 72 upon engagement of the hammer with the valve element end 72. Supplemental pockets, such as the pockets 112 and 118 may be provided to eliminate any possibility of squeeze film locking. The hammer 14 is thus of simplified construction and the arrangement including the split ring 124 facilitates the assembly of the impact tool. The relieved section 120 of the hammer 14 facilitates unrestricted circulation of fluid in the cavity 54.

Referring to FIG. 7, there is provided a one-piece hammer 14 wherein the upper end 50 of the hammer is relieved at 120 and is provided with a shoulder 140 which forms a tapered pocket with a complementary interior step 142 of a split ring 144 (see also FIG. 8). The split ring 144 has a lip 146 which snaps over an interior lip 148 of a generally cylindrical sleeve 150 which provides the valve element of the valve mechanism 58. The split ring 144 and the lip 148 of the sleeve 150 which are in latching relationship provide the upper end pocket of the valve element. The lower end 74 of the valve element and the step 68 on the hammer central section 48 provide the other pocket 104. The valve element 150 also has a central body 70 and passages 80 which function as described above in connection with the valve element 64 of FIG. 1.

The impact tool shown in FIG. 9 is provided with a one-piece hammer 14 and a one-piece valve element 152 in its valve mechanism 58. The upper end 50 of the hammer 14 is relieved at 120 and is provided with a shoulder 140 which forms the pocket with the upper end 154 of the valve element 152. The valve element 152 has a central body 70 and a lower end 74 which forms the lower pocket 104. Passages 80 are also provided in the valve element 152. The upper end 154 is provided with longitudinal slots 156 (see FIGS. 10 and 11) that enable the valve element 152 to be sprung over the hammer and yet provide a lip 158 and an internal step 160 which forms the upper pocket with the shoulder 140 on the upper end 50 of the hammer 14. The inner periphery of the lip 158 may be a conical surface tapered inwardly toward the step 160 or the upper end of the hammer may be tapered inwardly in a manner similar to that shown in FIG. 4(C). The housing sleeve 32 engages the outer peripheral surface 162 of the valve element end 154 with a sliding fit and captures the cantilevered slotted valve end 154 so as to damp it from radial vibration. Slots 164 which are cut at a bias with respect to the axis of the valve element 152 provide a path for the free circulation of fluid in the upper cavity 54 through the captured upper end 154 of the valve element 152.

Referring to FIG. 12 there is shown a valve mechanism 58 having a generally cylindrical sleeve valve element disposed with a sliding fit with respect to the housing sleeve 32. A plurality of longitudinal passages 170 which may be in the form of semi-circular slots provide for free circulation of fluid in the cavity 54 through the valve element 64. The lower end 172 of the valve element forms a pocket 174 upon engagement with the shoulder 68 of the central section 48 of the hammer 14. The end face 178 of the lower end 172 may be relieved to define a dash pot damper as shown in the above referenced patent application Ser. No. 285,240.

The upper end 180 of the valve element 164 is formed with a cylindrical projection 182 and is received in a pocket 184 of somewhat larger width than the projection 182. This pocket 184 is formed between the outer surface of the projection 182 and a notch 188 in the wall of the housing sleeve 32. As the projection 182 is received in the pocket 184, a hydraulic resistor is provided through which the volume of fluid which is confined in the pocket must pass (see the position of the upper end 180 shown by the dash line 190). The valve element 64 is then brought to a relative rest prior to the engagement of the upper valve element end 180 with the hammer. The valve mechanism 58 shown in FIG. 12 thus has a squeeze film damping mechanism at its lower end 172 with respect to the hammer and a pocket hydraulic damping mechanism at its upper end 180 with respect to the housing and is of a hybrid configuration. The projection 182 may be conically tapered as shown to provide motion control characteristics as described in connection with FIG. 4(A).

Referring to FIGS. 13 through 15 there is shown an impact tool having a single piece hammer 14 and a valve mechanism 58 with a three-piece valve element structure. The valve element structure includes a generally cylindrical sleeve 200 which is disposed in porting relationship with the ports 60 and 62. The lower end 202 of the sleeve 200 is similar to the lower end 74 of the valve element 64 shown in FIG. 1 and coacts with the shoulder 68 to form a pocket 104 when the shoulder 68 engages the end 202. Passages 80 are also provided for the free circulation of fluid in the upper cavity 54.

The other parts of the valve structure are provided by the two halves 204 and 206 of a split ring 208. The split ring 208 is captured in a groove 210 in the upper end 50 of the hammer 14 and also by the inner periphery of the sleeve 200, the upper end 212 and the central body 214 of which respectively engage rims 216 and 218 of the split ring 208. The slot 210 is longer than the split ring 208 to provide end play of the split ring in its motion with respect to the hammer 14. The sleeve 200 is thus permitted to move with respect to the split ring 208 especially at impact (viz, when the lower end of the hammer 14 strikes the shank 20). Slots 220 in the split ring 208 provide for free circulation of fluid in the cavity 54 through the split ring. The step 222 formed by the upper end of the groove 210 and the inner peripheral wall of the housing sleeve provide a pocket in which a volume of the fluid in the cavity 54 may be confined by flange 209 at the upper end of the split ring 208. Resistive leakage past the flange 209 provides for pocket or hydraulic resistive damping at the upper end of the stroke of the valve element. Tapered pocket damping is also provided at the lower end of the stroke of the valve element.

Referring to FIGS. 16 and 17 the valve mechanism 58 is therein shown as including a cylindrical sleeve 230 which provides the valve element. The outer periphery of the sleeve 230 is in porting relationship with the supply and return ports 60 and 62. Longitudinal grooves 232 provide for unrestricted circulation of fluid through the element 230 in the drive cavity 54. The valve element is moved when engaged by rings 234 and 236 which are spaced from each other on the upper end 50 of the hammer 14. The valve mechanism embodies a damper 238 for controlling the motion of the valve element especially when the valve element is engaged by the rings 234 and 236.

In the housing 12 there are arranged three confined fluid volumes 240. Plungers 242 disposed in openings in the housing which extend into the cavity 54 serve to confine the volumes 240. The plungers 242 may have longitudinal grooves 244 (see FIG. 18A) or holes 246 which also extend in a longitudinal direction through the plungers 242 (see FIG. 18(B)). The plungers are connected to the valve element 230 by rods 248. The rods 248 have enlarged ends 250 which are loosely mounted in slots 252 in the valve element 230. The dampers are disposed in balanced relationship approximately 120° apart around the hammer 14.

The grooves 244 or holes 246 provide resistance to the motion of the plunger 242 by virtue of the flow of the fluid therethrough which must be forced through these orifices or grooves as the valve element is moved by the hammer 14 as the rings thereon 234 and 236 engage and cause the valve element to travel on its upward and downward strokes. The loose connection in the groove 252 avoids binding of the valve element in the housing bore 38. A rigid connection may alternatively be provided. While balanced loading of the valve element for motion control purposes through the use of three dampers 238 is preferred, a pair of diametrically opposed dampers or a single damper may be suitable in some applications.

In the tool shown in FIGS. 19 and 20, the valve mechanism 58 includes a valve element 254, the ends of which engage the hammer rings 234 and 236. The valve element 254 is a generally cylindrical sleeve, the upper and lower ends of which are in porting relationship with the supply and return ports 60 and 62. A central step 256 projects radially outwards from the element 254 into a groove 258 in the housing sleeve 32. In this groove 258 there is confined a volume of the fluid in the drive cavity 54. This volume is divided into two parts 260 and 262 on opposite sides of the step 256. Fluid enters into the parts 260 and 262 of the confined volume of fluid by way of orifices 264 and 266 which extend radially through the valve element 254. Several of these orifices are provided between the longitudinal grooves 232. The longitudinal grooves 232 provide passages for unrestricted fluid flow through the valve element 254.

The length of the step 256 and its clearance relative to the wall of the groove 258 provide a laminar resistance for fluid flow between the parts 260 and 262 of the volume of fluid confined in the groove 258. As shown in FIG. 20 a plurality of longitudinal grooves 270 may be provided and the clearance between the step 256 and the wall of the groove 258 may be tight. Alternatively, and as will be discussed hereinafter in connection with FIGS. 21 and 22, longitudinal holes may be provided through the step 256. Thus, flow of fluid with respect to the confined volumes of fluid may be through the orifices 264 and 266 as well as longitudinally across the step 256. The fluid resistance provided by the orifices 264 and 266, and across the step whether through the clearance, the grooves 266 or through holes, provides continuous damping and controls the motion of the valve element 254 throughout its stroke, both in the upward and downward direction of travel.

It will be appreciated that the valve mechanism shown in FIG. 19 as well as the mechanism in other figures are illustrated schematically and distances shown between ports, orifices and cavities, valve element lengths and the like are intended to be designed, if not exactly so shown in the schematic illustration, so as to be of sufficient length that in executing its stroke the valve mechanism will provide the operation desired, as described for example in connection with FIG. 1.

Referring to FIGS. 21 and 22, the valve mechanism 58 there shown includes a valve element provided by a cylindrical sleeve 274 having a central groove 278 in its outer periphery. A piston ring 280 is captured in the groove 278 and is sprung radially outward into a groove 282 in the bore 38 of the housing sleeve 32. One end 284 of the groove 282 may be tapered so as to facilitate the assembly of the valve element in the bore 38 as well as the removal of the valve element therefrom. The piston ring 280 will cam over the tapered end 284 in the process of insertion and removal of the valve element sleeve 274 from the bore 38.

The wall 286 of the groove 282 is provided by a plurality of longitudinal grooves 288 of a length greater than the length of the piston ring 280. The piston ring has a plurality of holes 290 which extend longitudinally thereof and communicate the parts 260 and 262 of the volume of fluid confined in the groove 282. The grooves 288 and the holes 290 provide orifices through which fluid can flow between the confined volume parts 260 and 262. These parts will be filled with fluid which enters therein by way of leakage through the clearance between the bore 38 and the outer periphery of the valve element sleeve 274. Radial orifices such as the orifices 264 and 266 as shown in FIGS. 19 and 20 may also be provided if desired.

The orifices for fluid flow provided by the grooves 288 are in bridging relationship with the orifices provided by the holes 290. As long as the piston 280 and its holes 290 are bridged and effectively short-circuited for fluid flow by the grooves 288, the resistive damping in the longitudinal direction is reduced to a low value. As soon as the piston passes the ends of the grooves 288, however, the fluid resistance increases to a much higher value. Thus, the orifice grooves 288 permit the valve element to move relatively freely in the middle range of its stroke. At the ends of the stroke of the valve element, however, a strong fluid resistance and damping effect on the motion of the valve is provided. Accordingly, the valve mechanism is provided with variable motion control or damping which is a function of the position of the valve element during its stroke.

Referring to FIG. 23A, there is shown a valve mechanism 58 wherein hydraulic fluid forces are developed for controlling the motion of a valve element 300. These hydraulic forces are developed dynamically and statically due to applied fluid pressure. The valve element 300 is in the form of a cylindrical sleeve having a central step 302. A groove 304 in the bore 38 through the housing sleeve 32 defines the confined volume of fluid which is divided into two parts 306 and 308 by the step 302. A gallery 310 which is disposed in bridging relationship with the groove 304 is connected at is opposite ends with the opposite ends of the groove 304 by radial orifices 312. As the valve element 300 is moved, the fluid flows through these orifices 312 between the parts 306 and 308 of the confined volume. The hydraulic resistance presented by the orifices 312 develops damping forces which control the motion of the valve.

A groove 314 in the housing sleeve 32, which groove is disposed in the center of the groove 304, is connected by way of a channel 316 to the supply gallery 82. Another channel 318 connects the return gallery 92 to the gallery 310. Thus, as shown in FIG. 23(B) when the step 302 clears the groove 314 and moves to the lower end of its stroke, the part 308 will be maintained at supply pressure while the other part 306 of the confined fluid volume will be maintained at return pressure. The unbalanced pressure will develop a force against the area presented by the ends of the step 302 which will hold the valve element 300 at the position where it has been displaced by the upper ring 236 of the hammer 14 (i.e. at the bottom of the stroke of the valve element 300). Similarly when the lower ring 234 drives the step 302 past the groove 314, supply pressure will be applied to the part 306 with return being connected to the part 308. The unbalanced pressures then develop forces which tend to maintain the valve element 300 displaced in the position shown in FIG. 23(C), which is at the upper end of its stroke. The application of constant pressure to the valve element 300 has the feature of minimizing any rebounding when the rings move into engagement with the valve element ends, since the pressures on the valve element are not reversed until the step 302 moves past the groove 314. In addition, hydraulic forces, which are dynamically generated by flow through the orifices 312, are operative while the valve element is moving to control and damp the motion thereof.

If desired, pockets may be formed at the opposite ends of the valve element 300, shown in FIG. 23 or at the opposite ends of the valve elements 230, 254 and 274, shown in FIGS. 16, 19 and 21, to provide squeeze film damping on contact of the rings 234 and 236 with the valve element ends.

Referring to FIG. 24 there is shown another impact tool having a valve mechanism 58 which affords a hybrid actuation cycle. In the illustrated tool, the valve mechanism is actuated hydraulically on a downward stroke and mechanically by the hammer on its upward stroke. The valve mechanism 58 includes a cylindrical sleeve valve element 330 having a close sliding fit with the sleeve or liner 32 of the housing 12. The inner periphery of the valve element sleeve 330 may be formed with a plurality of circular grooves so as to lighten its weight. A central groove 332 captures a piston ring 334. The ring is sprung outwardly into a recess 336 in the bore 38 which is disposed between the supply and return ports 60 and 62. The recess 336 may be provided by a groove around the inner periphery of the bore 38. The piston ring 334 thus provides a step which rides along the recess 336. The recess 336 and the outer periphery of the valve element 330 defines a chamber which is divided into two parts 338 and 340 by the ring 334. This chamber confines a volume of hydraulic fluid. Fluid enters this chamber through leakage paths between the valve element 330 and bore 38, but primarily fluid enters the chamber through a channel 342 from the supply gallery 82. A cup 344 in this channel 342 defines an orifice or fluid resistor. The other part 340 of the chamber communicates with the return gallery 92 by way of a channel 346.

The differential area, as presented in a plane perpendicular to the axis of the bore 38, between the area of the recess 336 and the area of the bore 38 constitutes the exposed drive area of the piston ring 334. The valve element 330 will then tend to be driven downwardly by the pressure differentials in the parts 338 and 340 of the chamber.

The flow of fluid with respect to the chamber parts 338 and 340 is by way of peripheral grooves 348 and 350 into which the channels 342 and 346 extend. The lower end 352 of the groove 336 interferes with the piston ring 334 and provides a lower stop for the valve element 330. The supply pressure in the upper chamber part 338 and the return pressure in the lower chamber part 340 results in a downwardly-directed force on the valve element 330. When the piston ring 334 abuts against the groove end 352, the valve element 330 will be at the end of its downward stroke. The lower end 354 of the valve element 330 is in interfering relationship with a lip 356 which extends upwardly from the central section 48 of the hammer 14. Slots 358 (see FIG. 25) through the lip 356 provide for free circulation of the fluid in the drive cavity 54 between the valve element ends.

When the valve element 330 is at the end of its downward stroke, the groove end 352 then being in engagement with the piston ring 334, the supply port 60 will be closed by the valve element, while the return port 62 will be open. The hammer will then move upwardly from its impact position (the position shown in FIG. 24). The lip 356 of the hammer then mechanically engages the valve element 330 at its lower end 354 and moves the valve element 330 upwardly to close return port 62 and open supply port 60. The valve element will then travel with the decelerating hammer to the top of its stroke. When the hammer is driven downwardly in response to the force differential between the drive cavity 54 and the lower cavity 56, the valve element 330 will be driven hydraulically in response to the pressure differentials in the parts 338 and 340 of the chamber defined by the groove 336 and the valve element 330. At the impact position the valve element desirably will have reached the position in which the valve element is shown in FIG. 24. The valve element then travels the additional distance indicated as $X_s$ in FIG. 24 to the position where the piston 334 is stopped by the groove end 352, to allow for complete switching of the flow in the drive cavity 54. Over a final portion of the distance $X_s$ which is indicated as $X_B$ in FIG. 24, the piston enters a pocket which is formed immediately below the groove 350. The diameter of the groove 338 in this pocket may be slightly enlarged so as to provide a clearance which functions as a fluid resistor through which the fluid will flow at a controlled rate so as to tend to damp the terminal motion of the valve element 330. When the valve comes to a stop against the groove end 352 it is positioned at a distance $X_D$ which is equal to $X_o - X_s$, away from the lip 356 when the hammer is in contact with the shank 20. It is at this position that the hammer engages the valve element 330.

FIG. 27 illustrates the time history of the hammer displacement by the curve $X_H(t)$. The dash line curve $X_V(t)$ depicts the time history of the valve element displacement. The displacement of the hammer 14 was discussed above in connection with FIG. 1. The valve element is picked up by the hammer when it moves a distance $X_D$ and follows the hammer from that point of contact until time $T_1$ when switching occurs in the cavity 54. The valve element and the hammer then have different trajectories. The hammer is decelerated at a faster rate that the valve such that at the time of impact $T_p$ the valve element has returned to the switching position $X_o$ which is the position shown in FIG. 24. The valve element then travels down the distance $X_s$ and stops when it is the distance $X_D$ from the lip 356 when the hammer is in contact with the shank 20.

The orifice 344 may be used if it is desired to change the valve trajectory so that its motion is controlled by the hydraulic resistance presented by the orifice 344. The lower curves of FIG. 27 illustrate the relative trajectories of the hammer and valve element for the resistance controlled case.

Except for the recess 336, the bore 38 in the cylinder liner or sleeve 32 has the same diameter along its entire length. The valve element is in two parts, namely the piston ring 334 and the sleeve 330.

FIG. 26 illustrates an impact tool similar to the tool shown in FIG. 24 in that it has a hybrid hydraulic/mechanical, actuation cycle. The housing sleeve 32 is provided with a bore having two sections 360 and 362 of smaller and larger diameters respectively. The housing liner 34 has a lower section with a bore 364 of the same diameter as the bore 360. A cylindrical sleeve 366 which provides the valve element has an outer diameter which is toleranced for close fit with the sections 360 and 362 of the sleeves 32 and 34. A step 368 extends outwardly into a recess formed by a bore 370 of slightly larger diameter than the bore 360. The valve element 366 is therefore of one-piece construction as is the hammer 14. The operation of the tool shown in FIG. 26 is similar to the operation of the tool shown in FIG. 24, and, as heretofore, parts having similar functions are indicated by like reference numerals.

FIG. 28 illustrates an impact tool having a valve mechanism 58 which also provides a hybrid, hydraulic/mechanical, actuation cycle. A cylindrical sleeve 380 provides the valve element and has an upper portion 382 of larger outside diameter than its lower portion 384. A step 386 is defined between the larger and smaller diameter portions 382 and 384. The bore 38 in the housing sleeve or liner 32 also has portions 388 and 390 of relatively smaller and larger inner diameter which have close fits with the valve element portions 384 and 382. A chamber 392 is therefore defined between the valve element 380 and the wall of the bore 38. This chamber 392 is connected by way of a channel 394 and a peripheral groove 396 to the return gallery 92. An apertured cup 398 may be inserted into the channel 394 to provide an orifice which functions as a hydraulic resistance. When the supply port 60 is open to the drive cavity 54, a hydraulic force is exerted on the valve element 380 having a magnitude equal to the difference between the supply pressure and the pressure in the chamber 392 multiplied by the area presented by the step 386. This force is directed towards the bottom of the tool where the shank 20 is shown as being located. The valve element 380 is illustrated in the position which it reaches just at the moment when the hammer 14 impacts the shank 20. Thereafter the switching occurs. The momentum imparted to the valve element 380 will carry it past the switching position shown in FIG. 28 until the step 386 contacts the lower end of the chamber 392. The drive cavity 54 will then be switched to return; the return port 62 then having opened. The hammer 14 then moves upwardly and the lip 356 will mechanically engage the lower end 354 of the valve element 380. The hammer then carries the valve element 380 upwardly opening the supply port 60 and closing the return port 62. The trajectory of the valve element and hammer is, during the remainder of the cycle, similar to that of the hammer 14 and valve element 330 shown in FIG. 24 and discussed in connection with FIG. 27. The area of the step 386, the mass of the valve element 380 and the resistance presented by the orifice 398 control the trajectory of the valve element and are selected to provide the desired trajectory as was discussed in connection with FIG. 27.

The mechanisms shown in FIGS. 21 and 24, and those also shown in FIGS. 29, 30, 32 and 33, which are described hereinafter, are illustrated with piston rings to provide the differential area on which driving forces to actuate the valve element can be developed. In such instances, the bore 38 can be provided by a housing part of one-piece construction as shown in FIGS. 21 and 24. Alternatively, in these configurations, the bore 38 can be provided by a two-part housing construction, as illustrated in FIG. 26, and the valve element in a one-piece construction.

Referring to FIGS. 29, 30 and 31, there is shown another impact tool having a valve mechanism the actuation of which is entirely hydraulic, and is hydraulic-pressure controlled to provide control over the movement of a cylindrical sleeve 400 which provides the valve element. It will be noted that in FIG. 29 the parts are illustrated in the position which is reached in their cycle of oscillation at the instant the hammer impacts the shank 20. The parts are shown at the upward end of their stroke in FIG. 30.

The valve element 400 is illustrated as a two-part structure, one of the parts being a piston ring 402 and the other the cylindrical sleeve. Alternatively, a one-part valve construction and two-part sleeve construction can be employed as illustrated in FIG. 26. A groove 404 in the bore 38 of the housing sleeve 32 forms a chamber which is divided into two parts 406 and 408 by the piston ring 402. Peripheral grooves 410 and 414 at the lower and upper ends of the groove 404 are in communication with lines 416 and 418 which run downwardly along the length of the sleeve 32 (see FIG. 30). These lines may be drilled through the sleeve as may also be channels 420 and 422 which connect them with the grooves 410 and 414. The drilled lines are plugged after drilling as shown at 424.

Another line 426 (see FIG. 29) extends longitudinally from the return cavity 92 downwardly along the sleeve 32. This line 426 is in communication with a pair of peripheral grooves 428 and 430 in the portion of the bore which has a close fit with the central portion 48 of the hammer 14. Three additional peripheral grooves 432, 434 and 436, are spaced from each other between the grooves 428 and 430. As shown in FIG. 30 the groove 432 is in communication with the line 416 and the groove 436 is in communication with the line 418. A channel 440 connects the central groove 434 with the supply gallery 82. The hammer in the central section 48 is provided with a pair of spaced peripheral grooves 444 and 446 which are longer than the grooves 428 and 436. The hammer grooves 444 and 446 cooperate with the grooves 428 and 436 in the housing bore 38 to provide a four-way valve.

At the instant of impact of the hammer on the shank 20 (see FIG. 29), the groove 434 which is in communication with the supply gallery 82 is communicated with the groove 436 by way of hammer groove 446. Supply pressure is then applied by way of line 418 to the upper part 408 of the chamber formed by the valve element 400. Simultaneously, the groove 428 which is in communication with the return gallery 92 is connected by way of hammer groove 444 to the groove 432. Return pressure is then connected to the chamber part 406 by way of the line 416. Thus, at the instant of impact the pressure in the chamber part 408 is at supply while the pressure in the chamber 406 is at return, thus developing a hydraulic force which drives the valve element 400 downwardly towards the shank 20. The hammer driving pressures in the drive cavity 54 are then switched from supply to return so as to develop a net force on the hammer 14 to accelerate the hammer upwardly away from the shank 20.

The upward acceleration continues until time $T_1$. Switching then occurs in the four-way valve provided by the grooves 428 and 430 in the bore 38 and the hammer grooves 444 and 446. After an additional small upward motion the pressures in the chamber parts 406 and 408 are reversed and the valve element 400 moves to the position shown in FIG. 30. When the valve element 400 is in that position, the supply port 60 is open and the drive cavity is switched to supply pressure. The hammer is then decelerated and driven back to impact position as was described in connection with FIG. 1. When the hammer moves down to impact position, the four-way valve provided by the grooves 428 to 430 and 444 and 446 again reverses and the valve is driven downwardly. The relative position of the hammer grooves 444 and 446 and the grooves 428 to 436 in the bore control the movement and actuation of the valve element 400 so that switching from supply to return in the drive cavity 54 does not occur until after impact has taken place.

Another impact tool having a valve mechanism which is hydraulically actuated is illustrated in FIGS. 32, 33 and 34. Three peripheral grooves 460, 462 and 464 in the housing sleeve or liner bore 38 and a peripheral groove 466 in the central section 480 of the hammer 14 provides a three-way valve. This valve occupies a smaller longitudinal region of the tool than does the four-way valve described in connection with FIGS. 29 through 31 and thus affords a shorter impact tool.

The lower chamber part 406 is maintained at a pressure intermediate the supply and return pressure by channels 468 and 470 between the chamber part 406 and the supply and return galleries 82 and 92, respectively. The intermediate pressure is determined by the resistance due to cups 472 and 474 (see FIG. 32) which have orifices therein. The pressure in the upper chamber part 408 is switched from supply to return as a function of hammer position in a manner similar to that discussed in the case of the four-way valve in connection with FIGS. 29 through 31.

Referring to FIG. 35 there is shown another impact tool which is generally of the same type as illustrated in FIG. 1. It includes a hammer 14 which may be made in two parts so as to assemble the hammer 14 together with a valve element 500 in a housing 12. The hammer upper and lower sections define shoulders 502 and 504 which may make contact with the opposite sides of a central step 506 which extends radially inward from the valve element body. The valve element has a close sliding fit with the bore 38 in the housing sleeve or liner 32. The upper and lower ends 48 and 50 of the hammer also have close sliding fits with the housing sleeve bore 38, the bore thus serves to reference both the valve element 500 and the hammer 14.

By virtue of the diameters of the hammer 14 and the valve element 500 portions of the hydraulic fluid in the drive cavity 54 are confined in slits 508, 510 and 514 which are annular in shape and are provided by the clearance between the hammer 14 and the valve element 500. These slits provide laminar flow resistors, also known as Poiselle resistors, in series parallel relationship as shown in FIG. 36. Four resistors $R_1$, $R_2$, $R_3$ and $R_4$ are shown, two of which are $R_2$ and $R_3$ are provided, each by one-half of the area of the step 506 and provides for fluid circulation or flow (Q in FIG. 36). The direction of flow is always in the same direction indicated as being upwardly in FIG. 35 since the relative motion and the relative velocity of the hammer with respect to the valve is always in the same direction. Fluid circulation with respect to the valve element 500 is otherwise unrestricted by virtue of the longitudinal passages 512 which are provided to the valve element 500. When fluid is forced through the cylindrical slits 508, 510 and 514, hydraulic flow resistances are developed which are a function of the relative velocity of the hammer and the valve element.

The hammer has a time displacement history which is depicted by the curve $X_H(t)$ in FIG. 39. The valve follows the hammer and its displacement is shown by the dash line curve indicated as $X_V(t)$. The hydraulic resistance is a function of the width and length of the slits, and the viscosity of the hydraulic fluid in the cavity 54. The width of the slits is thus adjusted to provide the time displacement history illustrated in FIG. 39 whereby the valve element will operate to switch the pressures in the drive cavity from supply to return immediately after impact (viz, immediately after $T_o$). It may be noticed from FIG. 39 that the velocity of the hammer is commensurate with the velocity of the valve such that both hammer and valve are moving substantially at the same velocity at time $T_o$ and $T_p$ when engagement of the valve element and hammer occurs; thus substantially reducing any rebounding or erratic motion of the valve element.

FIG. 37 illustrates an impact tool which is similar to the tool shown in FIG. 35. A valve element 520 is provided by a cylindrical body, the outer periphery of which has a close sliding fit with the bore in the housing sleeve 32. The hammer 14 also has a close sliding fit in the bore 38. There is provided as part of the valve mechanism a pair of sharp-edged orifices 522 and 524 which are formed between the valve element 520 and the hammer 14. These sharp-edged orifices 522 and 524 are located in the hydraulic fluid-filled cavity 54 and serve to confine volumes of fluid in regions 526 and 528 located between a central step 530 in the valve element 520 and the orifices 522 and 524.

These orifices 522 and 524 each have parts 532, 534 and 536. The parts 532 are provided by cylindrical surfaces of a first diameter on the inner periphery of the valve element 520. The parts 534 are provided by conical surfaces which form a ramp. The parts 536 are provided by cylindrical surfaces of a second diameter larger than the first diameter. Sharp edges defined by rims 538 and 540 cooperate with these surfaces 532 to 536 to define the orifices 522 and 524. The orifices then have three parts which afford hydraulic resistors, the resistances of which vary at different rates, namely: The part defined by the surface 532 which has a constant high rate; The part defined by the ramp 534 which has a variable rate; and The part defined by the surface 536 which has a constant relatively low rate. By rate is meant the rate at which fluid is forced through the orifice as the hammer moves relative to the valve element 520 and the rate at which the forces applied to the valve element which tend to decelerate it are developed by virtue of the hydraulic resistance presented by the orifices 522 and 524. These decelerating forces control the motion of the valve element 20, effectively damping that motion so that the valve element follows the hammer; their trajectories being as shown in FIG. 39.

The forces developed by the orifices 522 and 524 which act on the valve element 520 are a function of the density of the hydraulic fluid in the cavity 54, the dimensions of the orifices and the square of the relative velocity of the hammer 14 and valve element 20. The variable rate orifice provided by the three-part 532, 534 and 536 orifice structure increases forces developed during high acceleration periods (i.e., the periods during the cycle of oscillation when the hammer shoulders 502 and 504 move into contact with the sides of the step 530). This is when the valve element 520 switches the flow in the drive cavity 54. Accordingly, the variable rate orifices 522 and 524 are effective in providing control of valve motion during the flow switching intervals and avoid erratic valve motion reducing the possibility of inopportune flow switching during these intervals.

The provision of a pair of orifices 522 and 524, both of which contribute to the control of the motion of the valve, ensure that the requisite control forces are developed.

A slit 542 is provided between the surface of the step 530 and the outer periphery of the hammer 14, and adds a laminar flow hydraulic resistance in parallel with the series combination of resistors provided by the orifices 522 and 524.

FIG. 38 illustrates the equivalent hydraulic circuit wherein the resistors $R_1$ and $R_2$ are provided by the orifices 522 and 524 respectively and the resistor $R_3$ which is provided by the slit 542 is in parallel with the series combination of the resistors $R_1$ and $R_2$.

From the foregoing description it will be apparent that there has been provided improved impact tools and valve mechanism for use in such tools and especially in hydroacoustic oscillators. While various embodiments of impact tools and valve structures associated therewith have been illustrated, it will be appreciated that variations and modifications therein within the scope of the invention will undoubtedly suggest themselves to those skilled in the art. Accordingly, the foregoing description should be taken merely as illustrative and not in any limiting sense.

What is claimed is:

1. An impact tool for producing percussive forces for application to a load which comprises a housing having a generally cylindrical opening therein, a hammer mounted in said opening for oscillatory movement in opposite directions axially of said opening toward and away from an impact position, said hammer and said housing including a side wall defining in said opening an annular cavity, a valve mechanism *for* modulating the flow of hydraulic fluid into and out of said cavity for producing pressure variations therein for sustaining the oscillations of said hammer, said valve mechanism including a valve element mounted in said cavity for movement in opposite directions axially of said cavity, pressurized hydraulic fluid supply and return means in said housing including supply and return ports [into] *entering* said cavity spaced from each other in a direction axially of said cavity and disposed in porting relationship with said valve element [to] *for* alternately [open] *opening* and [close] *closing* said ports as said valve moves in said opposite directions, said hammer having a radially extending portion which engages said valve element when said hammer moves in one of said opposite directions and *which* moves said valve element therewith in said one of said opposite directions *to a first switching position where the one of said ports which is open is closed by said valve element and the other of said ports which is closed is opened by said valve element,*

*said valve element and said hammer being free to move in said one of said opposite directions past said first switching position over different trajectories, said*

*hammer in its trajectory being spaced away from and never blocking any of said ports,* said valve element and the side wall of said housing which defines said cavity forming a chamber therebetween extending axially of said housing, said valve element having a portion extending radially [into said chamber] and presenting an area *in said chamber* in a plane perpendicular to the axis of said housing, means communicating with at least one of said pressurized hydraulic fluid supply and return means for providing *continuous* communication between said chamber and said *one of said* supply and return means for applying *net* hydraulic forces acting [continuously] *only* in the other of said opposite directions upon said valve element to move said valve element [continuously] in the other of said opposite directions *as said valve element travels over its trajectory between said first switching position and a second switching position where it opens the said one of said ports which it closes at said first switching position and closes said other of said ports which opens at said first switching position.*

2. The invention as set forth in claim 1 wherein said valve element has a step which extends into said chamber and defines said area, said supply means being in *continuous* communication with the part of said chamber on one side of said step and said return means being in *continuous* communication with said chamber on the opposite side of said step.

3. The invention as set forth in claim 1 wherein said hydraulic force applying means includes a passage between said chamber and said one of said hydraulic pressure return and supply means, and orifice means *in said passage* for controlling the flow of hydraulic fluid through said passage.

4. The invention as set forth in claim 1 wherein said chamber has an axial length sufficient to bring said element to a position where one of said ports is *already* open and the other of said ports is *already* closed when said valve element reaches the end of its travel in said other of said opposite directions.

5. The invention as set forth in claim 4 wherein said hydraulic force applying means is operative to apply said hydraulic force in the direction towards said impact position, said element having a step, and the end of said chamber closest to said impact position being engageable with said step at the end of the stroke of said valve in the direction toward said switching position, said end of said chamber being spaced with respect to said ports a sufficient distance to permit said valve element to open one of said ports and close the other after said housing reaches said impact position.

6. The invention as set forth in claim 1 wherein said housing has a pair of grooves each near [te] *the* opposite end of said chamber, separate channels providing communication between one of said grooves and said supply means and the other of said grooves and said return means, said valve element having a step located centrally of the axial length thereof into said chamber which defines said area.

7. The invention as set forth in claim 6 wherein said supply means channel is connected to the one of said grooves furthest from said impact position and said return means channel is connected to the one of said grooves closest to said impact position whereby said hydraulic forces are applied in the direction towards said impact position, said chamber extending beyond said groove closest to said impact position.

8. The invention as set forth in claim 6 wherein said valve element has a step therein extending into said chamber, separate channels communicating said supply means with the part of said chamber on the side of said step furthest from said impact position and said return means with the part of said chamber on the side of said step closest to said impact position whereby said hydraulic forces are applied to move said valve toward said impact position and said channel to said supply means having an orifice therein presenting hydraulic resistance to the flow of fluid which controls the trajectory of said valve element as it moves in the direction toward said impact position.

9. The invention as set forth in claim 1 wherein said chamber is formed by an annular groove in said housing, said valve element having an annular groove facing said housing groove, and a piston ring captured in said element groove and extending into said housing groove said ring providing said area.

10. The invention as set forth in claim 1 wherein said valve element is a cylindrical sleeve having a centrally located step integral with said cylindrical sleeve, said housing having a plurality of cylindrical parts, one of said parts having a first region of interior diameter equal to the outer diameter of said sleeve as measured on opposite sides of said step, a second region of interior diameter larger than said first region interior diameter and a third region of interior diameter larger than the interior diameter of said second region, said regions being disposed adjacent each other in the axial direction, another of said housing parts being disposed inside of said third region and having an outer diameter equal to the interior diameter of said third region and an inner diameter equal to the interior diameter of said first region, said chamber being located between said other part and said first region and defined by said second region, said valve element overlapping both said first region and other housing part.

11. The invention as set forth in claim 1 wherein said valve element is a cylindrical sleeve having axially adjacent regions of larger and smaller outer diameter which define an annular step therebetween, which defines said area, said housing also having axially adjacent regions of larger and smaller inner diameter respectively, approximately equal to said smaller and larger outer diameter regions of said valve element respectively and corresponding thereto, said corresponding regions being disposed in overlapping relationship to define said chamber therebetween.

12. The invention as set forth in claim 11 wherein said step in said valve element presents an area smaller than the area presented by any of the ends of the cylindrical sleeve in a direction perpendicular to the axial direction, and wherein a channel is provided in said housing communicating said chamber with said return means for applying said hydraulic forces on said valve element in a direction towards said impact position when said supply port to said cavity is open.

* * * * *